US007957008B2

(12) United States Patent
Hosobuchi

(10) Patent No.: US 7,957,008 B2
(45) Date of Patent: Jun. 7, 2011

(54) OPTICAL-TYPE ROTATIONAL BODY POSITION DETECTION APPARATUS

(75) Inventor: Hiroyuki Hosobuchi, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 135 days.

(21) Appl. No.: 12/506,668

(22) Filed: Jul. 21, 2009

(65) Prior Publication Data

US 2010/0020336 A1 Jan. 28, 2010

(30) Foreign Application Priority Data

Jul. 25, 2008 (JP) ................................ 2008-191643

(51) Int. Cl.
*G01B 11/14* (2006.01)
*G01N 21/84* (2006.01)

(52) U.S. Cl. ........................................ 356/614; 356/426

(58) Field of Classification Search ........... 356/600–640
See application file for complete search history.

(56) References Cited

U.S. PATENT DOCUMENTS

2006/0114750 A1* 6/2006 Iida et al. ........................ 368/67

FOREIGN PATENT DOCUMENTS

| | | | |
|---|---|---|---|
| EP | 1 662 343 | A2 | 5/2006 |
| JP | 2000-162335 | A | 6/2000 |
| JP | 2004-163248 | A | 6/2004 |
| JP | 2007-040863 | A | 2/2007 |

OTHER PUBLICATIONS

Japanese Office Action dated Apr. 30, 2010 and English translation thereof, issued in counterpart Japanese Application No. 2008-191643.

* cited by examiner

*Primary Examiner* — Gregory J Toatley
*Assistant Examiner* — Jarreas C Underwood
(74) *Attorney, Agent, or Firm* — Holtz, Holtz, Goodman & Chick, PC

(57) ABSTRACT

An optical-type rotational body position detection apparatus includes a body being rotational in a predetermined angle at each predetermined time interval to cross an optical axis between fixed light emitting and detecting units, including a standard position hole on a rotational locus crossing the axis, and configured such that after rotating the body at one interval from a standard position at which the hole coincides with the axis, a periphery of the hole is positioned outside the periphery at the standard position. The apparatus further includes a restriction unit on a support to cross the axis and to permit light passing and to restrict a diameter of the passing light. The restriction unit restricts the diameter of the passing light to be smaller than a minimum distance within a positional displacement tolerable error range of the hole after the predetermined angled rotation of the body.

19 Claims, 23 Drawing Sheets

OPTICAL-TYPE ROTATIONAL BODY POSITION DETECTION APPARATUS

CROSS-REFERENCE TO RELATED APPLICATIONS

This application is based upon and claims the benefit of priority from prior Japanese Patent Application No. 2008-191643, filed Jul. 25, 2008, the entire contents of which are incorporated herein by reference.

BACKGROUND OF THE INVENTION

1. Field of the Invention

The present invention relates to an optical-type rotational body position detection apparatus.

2. Description of the Related Art

An optical-type rotational body position detection apparatus is already known from, for example, Japanese Patent Application KOKAI Publication No. 2000-162335.

This publication discloses an apparatus for optically detecting standard positions of a second wheel, a minute wheel and an hour wheel in order to detect standard positions of a second hand, a minute hand and an hour hand in a hand type wrist watch, that is, an optical-type rotational body position detection apparatus.

The second wheel of the hand type wrist watch is rotated in a unit of a predetermined angle at each of predetermined time intervals by a first driving system which includes a first driving motor and a plurality of intermediate wheels. Each of the minute wheel and the hour wheel of the hand type wrist watch is rotated in a unit of a predetermined angle at each of predetermined time intervals by a second driving system which includes a second driving motor and a plurality of intermediate wheels. The second wheel, the minute wheel and the hour wheel are coaxially rotatably supported by a main plate. The optical-type rotational body position detection apparatus includes a light emitting device functioning as a light emitting unit, and a light receiving device functioning as a eight detecting unit, which are disposed in both sides of the second wheel, minute wheel and hour wheel.

A standard position light transmission hole is formed in each of the second wheel, minute wheel and hour wheel so that the light transmission hole is positioned on a rotational locus on each wheel, which intersects an optical axis connecting the light emitting device and the light receiving device.

With the above-described conventional optical-type rotational body position detection apparatus which is combined with the conventional hand-type wrist watch, when a need has occurred to set the standard positions of the second hand, minute hand and hour hand (i.e. the standard positions of the second wheel, minute wheel and hour wheel), the second wheel is rotated by the first driving system and the minute wheel and hour wheel are rotated by the second driving system while light is being emitted by the light emitting device. When the standard position light transmission holes of the second wheel, minute wheel and hour wheel coincide with the above-described optical axis during the rotations of these wheels, the light receiving device can detect the light from the light emitting device and it is recognized that at this time the second hand, minute hand and hour hand (i.e. the second wheel, minute wheel and hour wheel) are set at their standard positions.

However, owing to the manufacturing tolerable error of each of the second wheel, minute wheel and hour wheel, the manufacturing tolerable error of each of the plural intermediate wheels of the first driving system and the manufacturing tolerable error of each of the plural intermediate wheels of the second driving system, back-lashes occur in each of the combination of the second wheel and the various intermediate wheels of the first driving system and the combination of the minute wheel, and hour wheel and the various intermediate wheels of the second driving system. In addition, the standard position light transmission hole of each of the second wheel, minute wheel and hour wheel has a manufacturing tolerable error.

Thus, even if the standard position light transmission hole of each of the second wheel, minute wheel and hour wheel coincides with the above-described optical axis and the light receiving device can detect the light from the light emitting device so that it is detected that the second wheel, minute wheel and hour wheel are positioned at their standard positions (i.e. the second hand, minute hand and hour hand are positioned at their standard positions), it is possible that the center of the standard position light transmission hole of each of the second wheel, minute wheel and hour wheel does not coincide with the above-described optical axis and hence the second hand, minute hand and hour hand are slightly displaced from their standard positions. This means that, in the case where the standard positions of the hour hand, minute hand and second hand are at 0 hour: 0 minute: and 0 second, the second hand, minute hand and hour hand do not completely overlap with each other at these standard positions.

The present invention has been made in consideration of the above-described circumstances, and an object of the present invention is to provide an optical-type rotational body position detection apparatus which can detect the position of a rotational body more precisely than in the prior art.

BRIEF SUMMARY OF THE INVENTION

According to an aspect of the present invention, an optical-type rotational body position detection apparatus comprises: a light emitting unit which is configured to emit light; a light detecting unit which is configured to detect light; a fixing support member which supports the light emitting unit and the light detecting unit such that the light emitting unit and the light detecting unit are mutually opposed to and spaced apart from each other, and that light from the light emitting unit is detected by the light detecting unit; a rotational body which rotates in a predetermined angle at each of predetermined time intervals to cross an optical axis connecting the light emitting unit and the light detecting unit, which includes a standard position light transmission hole disposed on a rotational locus crossing the optical axis, and which is configured such that after the rotational body takes one rotational movement over the predetermined angle within the predetermined time interval from a standard position at which a center of the standard position light transmission hole coincides with the optical axis, a peripheral edge of the standard position light transmission hole is positioned outside the peripheral edge of the standard position light transmission hole positioned at the standard position; and a light transmission restriction unit which is integrally provided on the fixing support member, which is disposed at a position crossing the optical axis, which permits passing of light, and which restricts a diameter of the passing light.

The light transmission restriction unit restricts the diameter of the light passing therethrough in such a manner that the diameter of the passing light is restricted to a diameter which is smaller than a minimum distance from the peripheral edge of the standard position light transmission hole to the optical axis within a range of a tolerable error of a positional displacement caused in the standard position light transmission hole by the one rotational movement over the predetermined angle with the predetermined time interval of the rotational body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 14A, 14B, 14C, 14D, 145, 14F, 14G, 14H, 14I, 14J, 14K, 14L and 14M schematically show the state in which a plurality of arcuate light transmission holes formed in the second wheel and light-blocking portions therebetween cooperate with the optical axis, while the second wheel rotates from the standard position, where the standard position light transmission hole of the second wheel coincides with the optical axis between the light emitting unit and light detecting unit, to a position immediately before the second wheel completes a single rotation by a predetermined number of times of rotation over a predetermined rotation angle of a predetermined time interval;

DETAILED DESCRIPTION OF THE INVENTION

Embodiment 1

Figure 1:
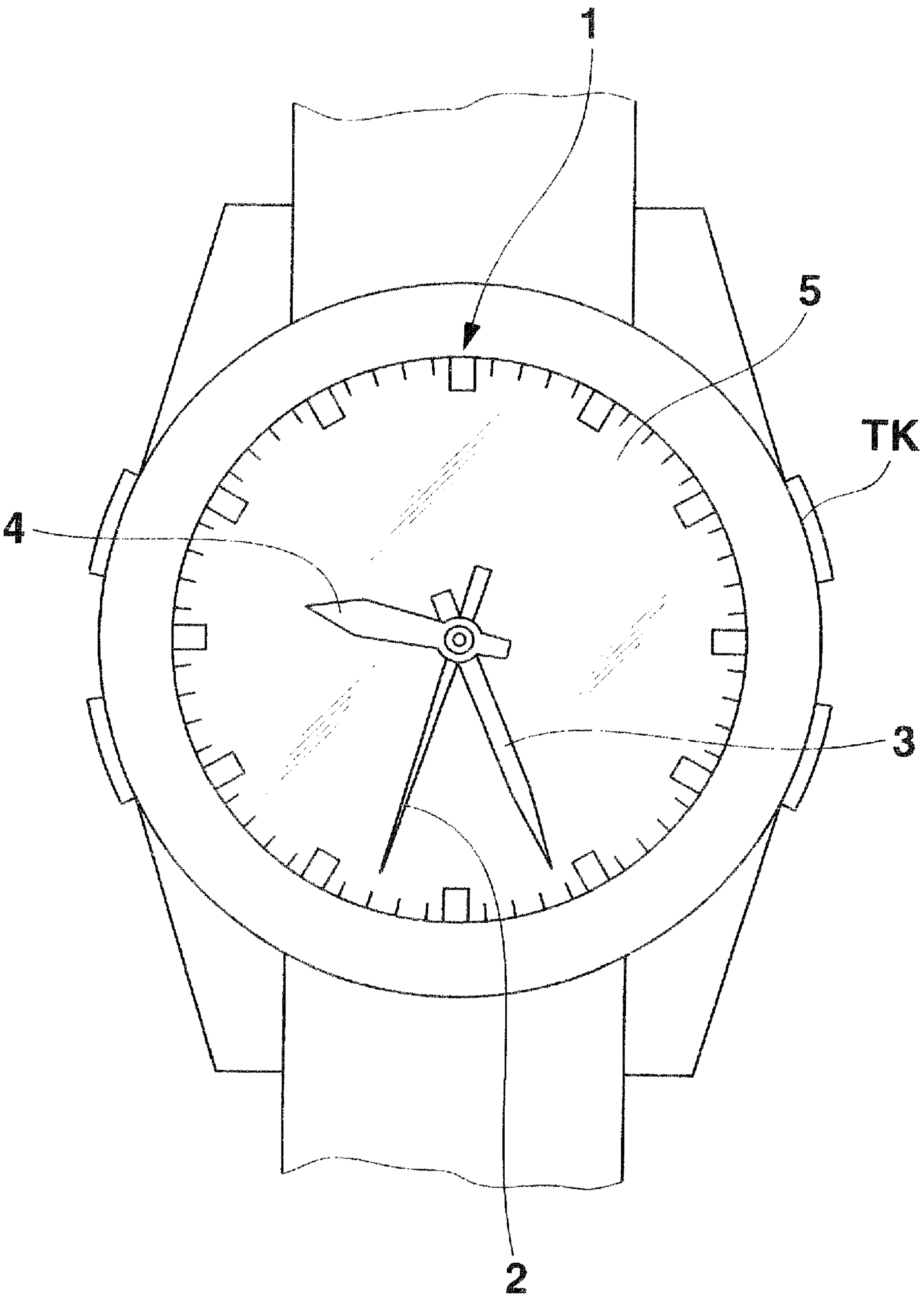
FIG. 1 is a plan view which schematically shows the external appearance of a hand type wrist watch which is combined with an optical-type rotational body position detection apparatus according to an embodiment of the present invention.
Figure 2:
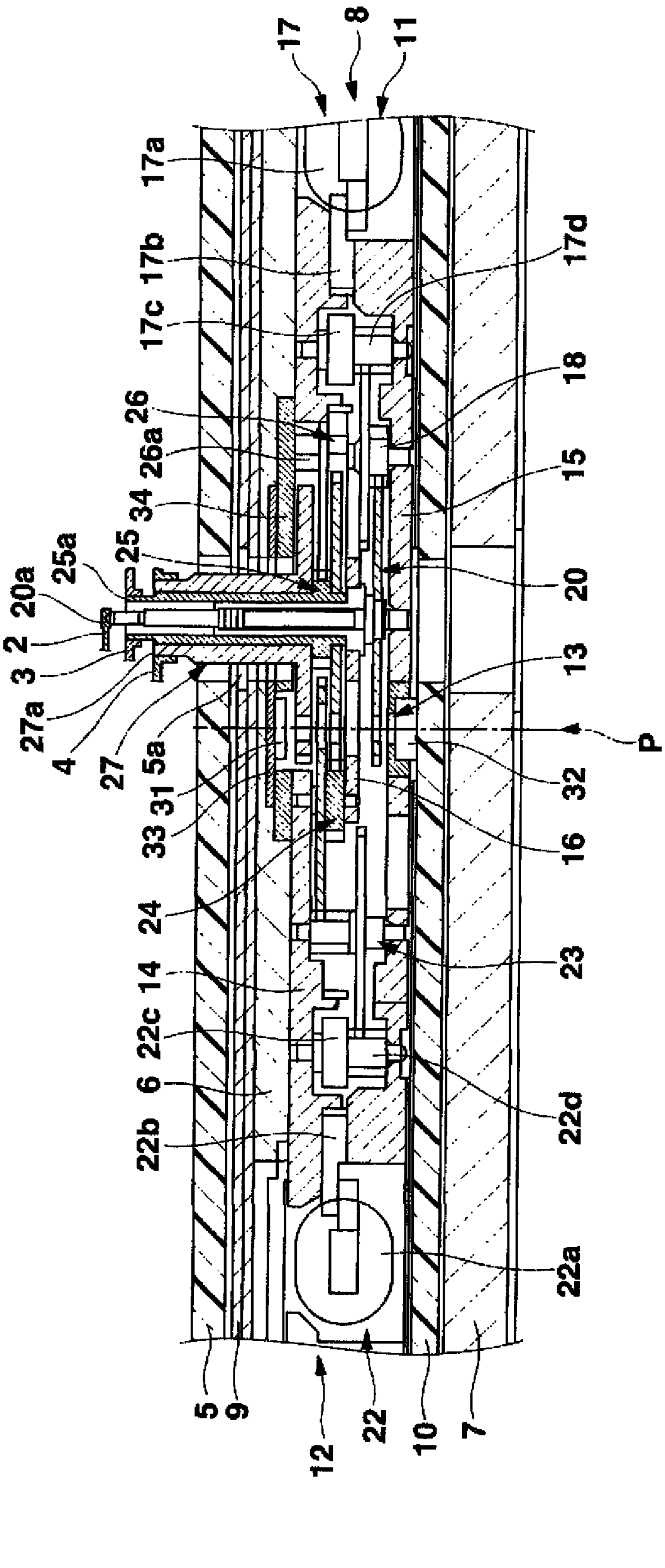
FIG. 2 is a vertical cross-sectional view which schematically shows a main part of a time-piece module of the hand type wrist watch shown in FIG. 1.

FIG. 1 schematically shows the external appearance of a hand type wrist watch which is combined with an optical-type rotational body position detection apparatus according to an embodiment of the present invention. FIG. 2 schematically shows a cross section of a main part of a time-piece module of the hand type wrist watch shown in FIG. 1.

The hand type wrist watch includes a time-piece module 1 which is accommodated in the inner space of a substantially cylindrical watch case TK. The time-piece module 1 includes a dial plate 5; a second hand 2, a minute hand 3 and a hour hand 4 which are rotated over the surface of the dial plate 5; and time-piece movement 8 for driving the second hand 2, minute hand 3 and hour hand 4, the time-piece movement 8 being disposed between an upper housing 6 and a lower housing on the back side of the dial plate 5.

In the inner space of the watch case TK, an opening on the dial plate 5 side is covered with a watch glass. In this inner space, an opening on the side opposite to the dial plate 5 is covered with a case back. A pair of strap attachment portions, to which proximal end portions of a pair of watch straps are attached, are formed at two diametrically opposed parts of the watch case TK on the peripheral surface of the watch case TK. In addition, a plurality of push buttons for causing the time-piece module 1 to execute various functions are disposed between the paired strap attachment portions on the peripheral surface of the watch case TK.

The dial plate 5 is formed of a light transmissive material. The time-piece module 1 includes a solar panel 9 between the upper housing 6 and the dial plate 5. The time-piece movement 8 includes a circuit board 10 which is disposed along the inner surface of the lower housing 7, and a support board 33 which is disposed along the inner surface of the upper housing 6. A battery (not shown) is held on the circuit board 10. Electricity, which is generated by the solar panel 9, is accumulated in the battery.

The time-piece movement 8 includes, between the upper housing 6 and the support board 33 on the inside of the upper housing 6, on one hand, and the circuit board 10 on the inside of the lower housing 7, on the other hand, a main plate 14, a train wheel bridge 15, a center wheel bridge 16 and a minute wheel hold plate 34, which support a first driving system 11 for rotating and driving the second hand 2 and a second driving system 12 for rotating and driving the minute hand 3 and hour hand 4. The time-piece movement 8 further includes a position detector 13 for detecting the positions of the second hand 2, minute hand 3 and hour hand 4.

The main plate 14, train wheel bridge 15 and center wheel bridge 16 support a second wheel (fourth wheel) 20, a minute wheel (center wheel) 25 and an hour wheel 27 such that these wheels are mutually concentric and rotatable to each other.

Figure 4:
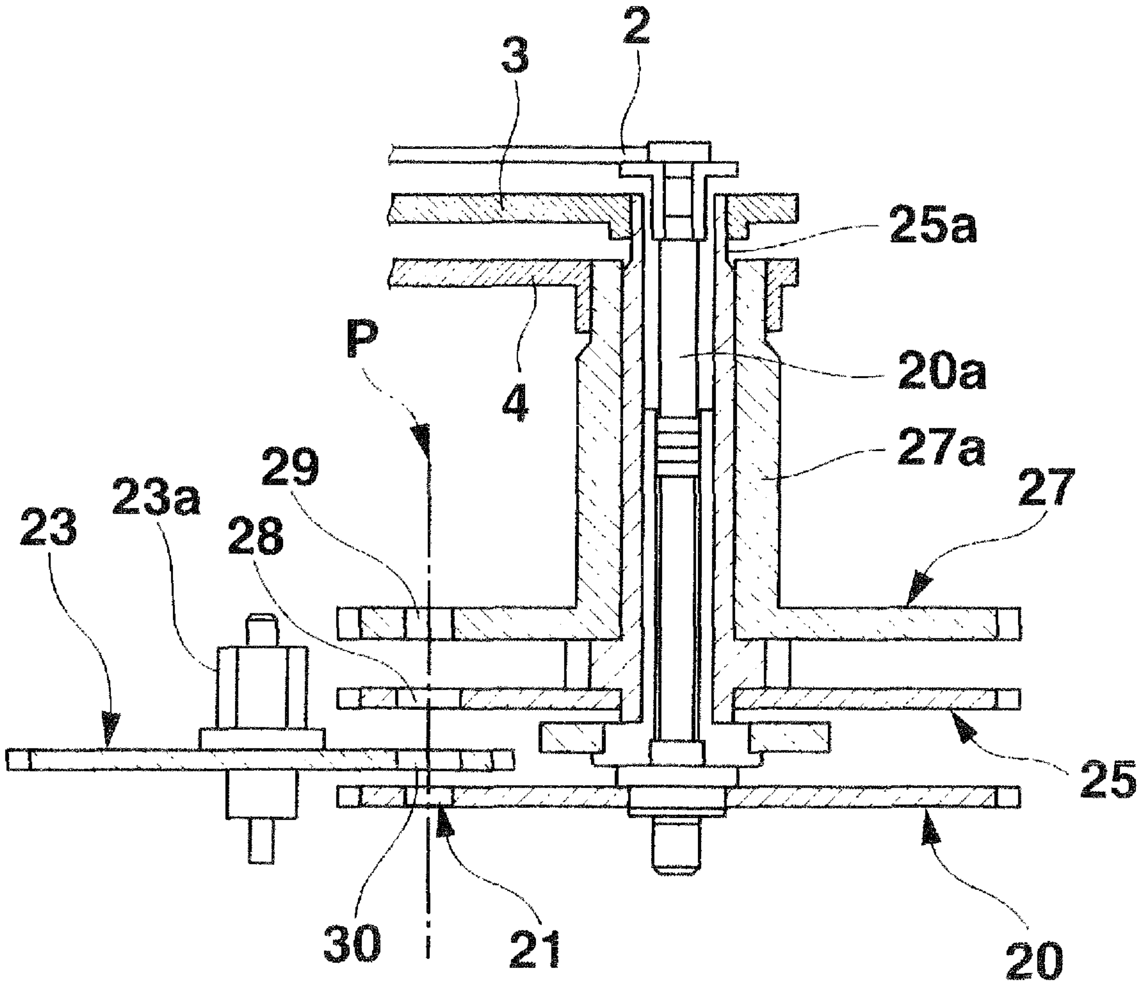
FIG. 4 is a vertical cross-sectional view which schematically shows, in enlarged scale, the mutually coaxially rotatably disposed second wheel, minute wheel and hour wheel, and an intermediate wheel of the second diving system for driving the minute wheel and hour wheel in the time-piece module shown in FIG. 2, these wheels being disposed at standard positions where standard position light transmission holes of the respective wheels are made to coincide with an optical axis between a light emitting unit and a light detecting unit.

As shown in FIG. 4 in enlarged scale, the second wheel 20 includes a second hand shaft 20*a* which penetrates the minute wheel hold plate 34, support board 33, upper housing 6, solar panel 9 and a hand shaft pass hole 5*a* of the dial plate 5. The second hand 2 is fixed to an outer end of the second hand shaft 20*a*, which projects to the outside of the dial plate 5. The minute wheel 25 includes a cylindrical minute hand shaft 25*a* which penetrates the minute wheel hold plate 34, support board 33, upper housing 6, solar panel 9 and the hand shaft pass hole 5*a* of the dial plate 5 along the outer peripheral surface of the second hand shaft 20*a*. The minute hand 3 is fixed to an outer end of the minute hand shaft 25*a*, which projects to the outside of the dial plate 5. Further, the hour wheel 27 includes a cylindrical hour hand shaft 27*a* which penetrates the minute wheel hold plate 31, support hoard 33, upper housing 6, solar panel 9 and hand shaft pass hole 5*a* of the dial plate 5 along the outer peripheral surface of the minute hand shaft 25*a*. The hour hand 4 is fixed to an outer end of the hour hand shaft 27*a*, which projects to the outside of the dial plate 5.

Figure 3:
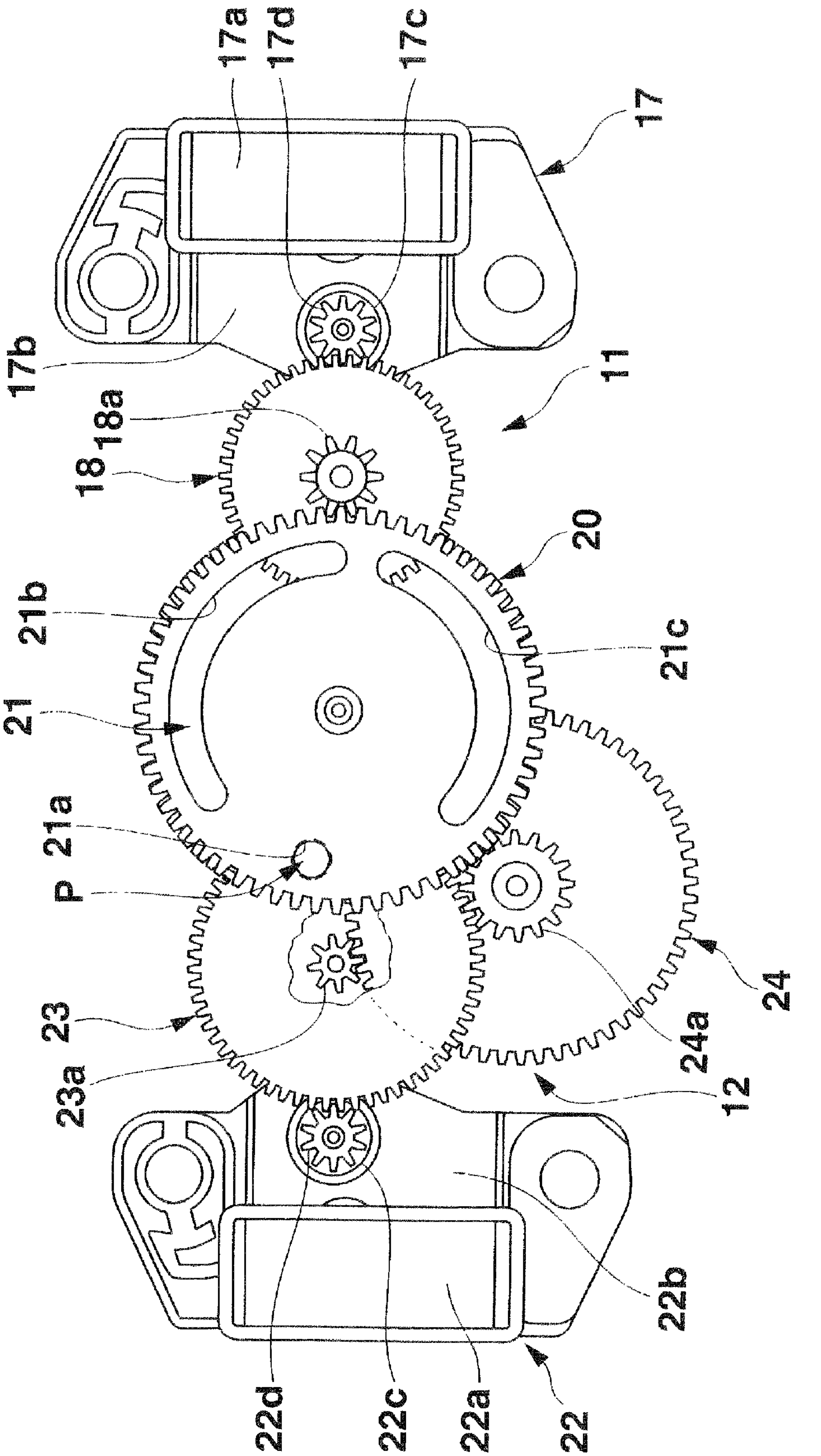
FIG. 3 is a back side view which schematically shows a second wheel, parts of a first driving system for driving the second wheel, and parts of a second driving system for driving a minute wheel and an hour wheel in the time-piece module shown in FIG. 2.

As shown in FIG. 2 and FIG. 3, the first driving system 11 includes a first stepping motor 17, and a fifth wheel 18 which is rotatably supported on the train wheel bridge 15 and transmits a torque from the first stepping motor 17 to the second wheel (fourth wheel) 20.

The first stepping motor 17 includes a stator 17*b* around which a coil 17*a* is wound; a rotor 17*c* which is supported to be rotatable relative to the stator 17*b*; and a rotor output wheel 17*d* which is fixed concentric to the rotor 17*c*. The rotor 17*c* is equipped with a permanent magnet which is magnetized in a constant state. The coil 17*a*, which is supplied with electric current from the above-described battery (not shown), generates a magnetic field. By the magnetic field that is led to the stator 17*b*, the rotor 17*c* is rotated stepwise in units of 180°. The rotation of the rotor 17*c* is transmitted to the second wheel (fourth wheel) 20 via the fifth wheel 18, and further transmitted to the second hand 2 via the second hand shaft 20*a*.

The second wheel 20 is provided with a first light transmission hole portion 21 which is used in order to detect the standard position of the second wheel 20 in cooperation with the position detector 13. The details of the first light transmission hole portion 21 will be described later.

As shown in FIG. 2 and FIG. 3, the second driving system 12 includes a second stepping motor 22; an intermediate wheel 23 which is rotatably supported on the main plate 14 and train wheel bridge 15 and to which a torque from the second stepping motor 22 is transmitted; and a third wheel 24 which is rotatably supported on the main plate 14 and center wheel bridge 16 and transmits a torque from the intermediate wheel 23 to the minute wheel (center wheel) 25.

As shown in FIG. 2 to FIG. 4, the second driving system 12 includes the second stepping motor 22; the intermediate wheel 23 which is rotated by the second stepping motor 22; the third wheel 24 which is rotated by the intermediate wheel 23; the minute wheel 25 that is the center wheel, which is rotated by the third wheel 24; a minute wheel 26 which is rotated by the minute wheel 25; and the hour wheel 27 which is rotated by the minute wheel 26. The minute hand 3 is attached to the minute hand shaft 25*a* of the minute wheel 25, and the hour hard 4 is attached to the hour hand shaft 27*a* of the hour wheel 27.

As shown in FIG. 3, the second stepping motor 22 includes a coil 22*a*, a stator 22*b* and a rotor 22*c*. Like the first stepping motor 17, electric current is supplied to the coil 22*a* to generate a magnetic field. The magnetic field, which is generated by the coil 22*a*, is led to the stator 22*b*. By the magnetic field that is led to the stator 22*b*, the rotor 22*c*, which includes a permanent magnet that is magnetized (i.e. polarized with an N pole and an S pole) in a constant state, is rotated stepwise in units of 180°.

Figure 5:
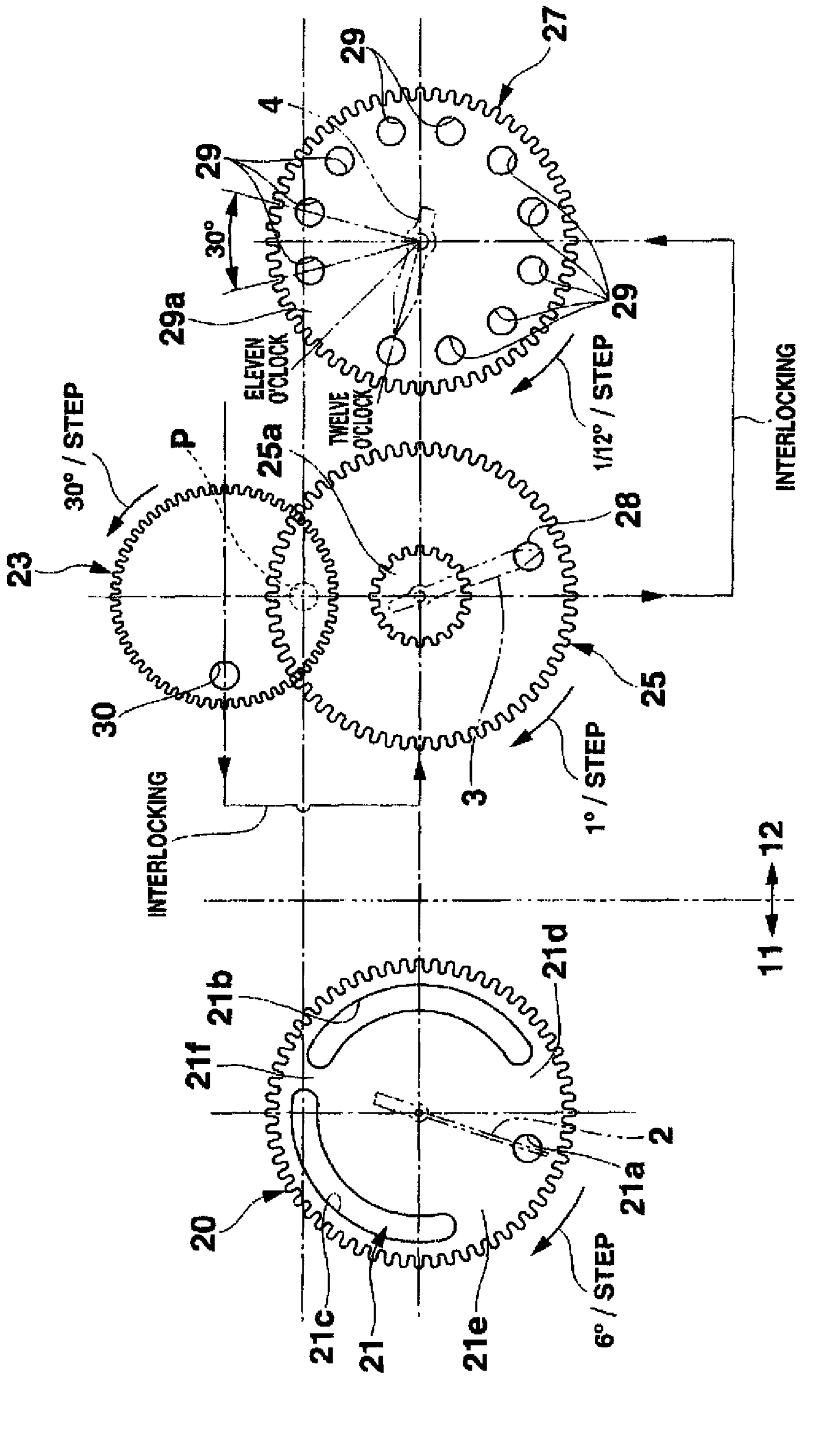
FIG. 5 is a schematic exploded view showing the standard position light: transmission holes which are formed in the second wheel, minute wheel, hour wheel and intermediate wheel shown in FIG. 4, which are depicted as being separated from each other.

As shown in FIG. 2 and FIG. 3, the intermediate wheel 23 rotates in mesh with a rotor pinion 22*d* of the rotor 22*c* of the second stepping motor 22. As shown in FIG. 5, the intermediate wheel 23 is provided with a fourth light transmission hole portion 30. The third wheel 24 rotates in mesh with a pinion 23*a* of the intermediate wheel 23, and the minute wheel 25 rotates in mesh with a pinion 24*a* of the third wheel 24. As shown in FIG. 2 and FIG. 4, the second hand shaft 20*a* of the second wheel 20 is rotatably inserted in a central portion of the minute wheel 25, and the upwardly projecting cylindrical minute hand shaft 25*a* is provided at the central portion of the minute wheel 25.

As shown in FIG. 2, the minute hand shaft 25*a* is configured to project upward through the through-holes 5*a* of the upper housing 6, solar panel 9 and dial plate 5, and the minute hand 3 is attached to the projecting distal end portion thereof, as shown in FIG. 4. Thereby, the minute wheel 25 is disposed coaxial with the second wheel 20 in the state in which the minute wheel 25 overlaps the second wheel 20 on the lower side. In addition, as shown in FIG. 5, the minute wheel 25 is provided with a second light transmission hole portion 28.

As shown in FIG. 2, the minute wheel 26 is held by the minute wheel hold plate 34 so as to be rotatable together with the hour wheel 27. In this state, the minute wheel 26 rotates in mesh with the pinion 25*a* of the minute wheel 25. As shown in FIG. 2, the hour wheel 27 rotates in mesh with a pinion 26*a* of the minute wheel 26. As shown in FIG. 4, the minute hand shaft 25*a* of the minute wheel 25 is rotatably inserted in a central portion of the hour wheel 27, and the upwardly projecting cylindrical hour hand shaft 27*a* is provided at the central portion of the hour wheel 27.

As shown in FIG. 2, the hour hand shaft 27*a* is configured to project upward through the through-holes 5*a* of the minute wheel hold plate 34, upper housing 6, solar panel 9 and dial plate 5, and the hour hand 4 is attached to the projecting distal end portion thereof, as shown in FIG. 4. Thereby, the hour wheel 27 is disposed coaxial with the second wheel 20 and minute wheel 25 in the state in which the hour wheel 27 overlaps the minute wheel 25 on the lower side. In addition, as shown in FIG. 5, the hour wheel 27 is provided with a third light transmission hole portion 29.

In the meantime, a hand position detection apparatus, which detects the positions of the hand wheels in this watch, is configured to optically detect, by the position detector 13, the positions of the first to fourth light transmission hole portions 21 and 28 to 30 which are provided in the second wheel 20, minute wheel 25, hour wheel 27 and intermediate wheel 23, thereby detecting the rotational positions of the second wheel 20, minute wheel 25, hour wheel 27 and intermediate wheel 23. Thus, the hand position detection apparatus determines the rotational positions of the second hand 2, minute hand 3 and hour hand 4.

Figure 10:
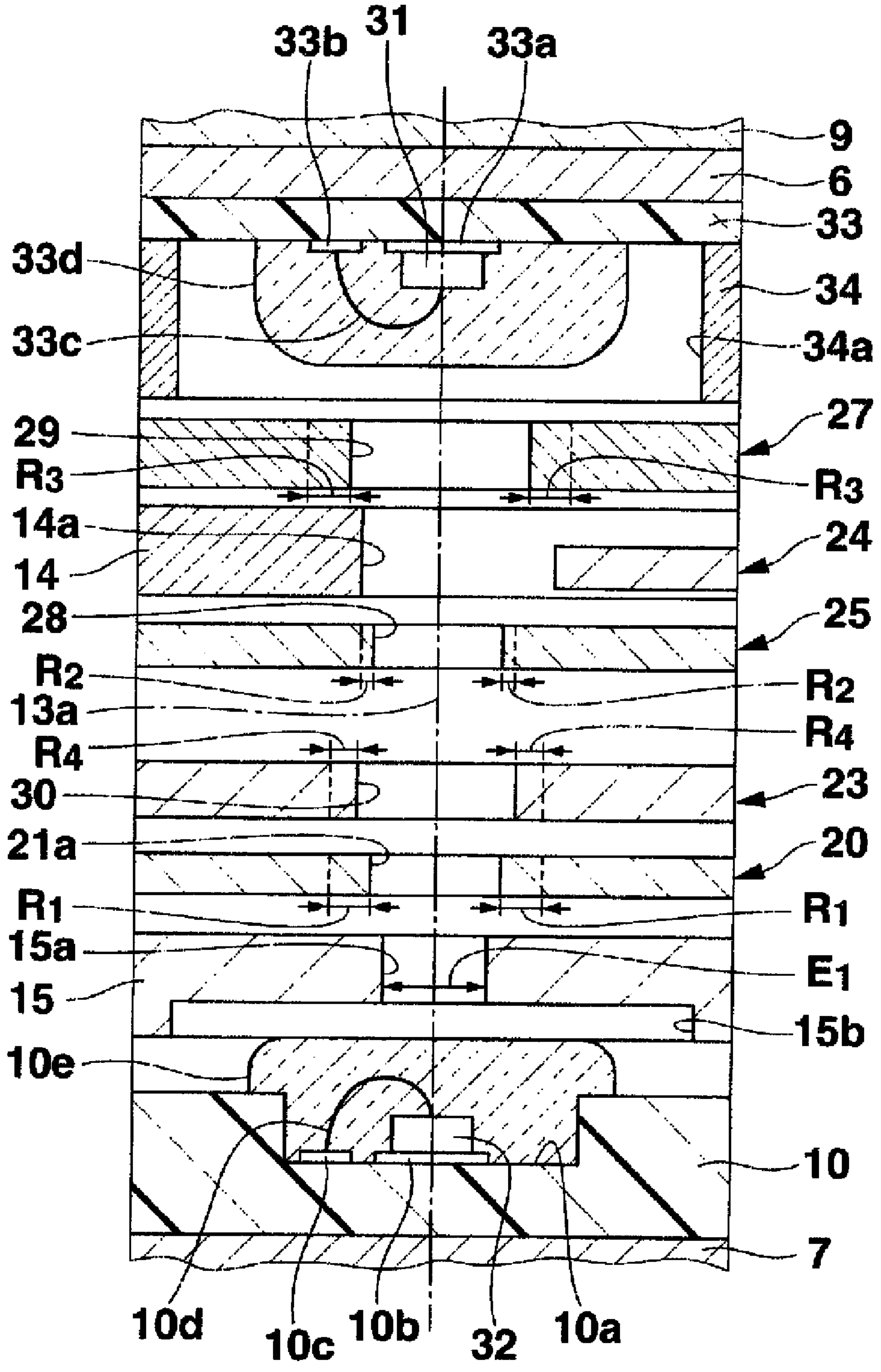
FIG. 10 is a vertical cross-sectional view showing, in engaged scale, a part of the time-piece module of FIG. 2 along line X-X in FIG. 9.

Specifically, as shown in FIG. 2, FIG. 4 and FIG. 10, the position detector 13 includes a light emitting device 31 and a light receiving device 32. A detection position P is provided on an optical axis 13*a* which connects the light emitting device 31 and light receiving device 32. The light emitting device 31 is composed of an LED (light-emitting diode) and, as shown in FIG. 2, FIG. 4 and FIG. 10, the light emitting device 31 is provided on the support board 33 on the lower surface of the upper-side upper housing 6 at a position where the second wheel 20, minute wheel 25 and hour wheel 27 coaxially overlap and also the intermediate wheel 23 partly overlaps. The light receiving device 32 is composed of a photo-transistor, and is provided on the circuit board 10 on the lower side (the upper side in FIG. 2) at a position corresponding to the light emitting device 31.

Thereby, as shown in FIG. 2, FIG. 4 and FIG. 10, when all the first to fourth light transmission hole portions 21 and 28 to 30 of the second wheel 20, minute wheel 25, hour wheel 27 and intermediate wheel 23 have come to correspond on the optical axis 13*a*, the light receiving device 32 receives light from the light emitting device 31 through the first to fourth light transmission hole portions 21 and 28 to 30, and thus the position detector 13 is configured to detect the rotational positions of the second wheel 20, minute wheel 25 and hour wheel 27.

Figure 6:
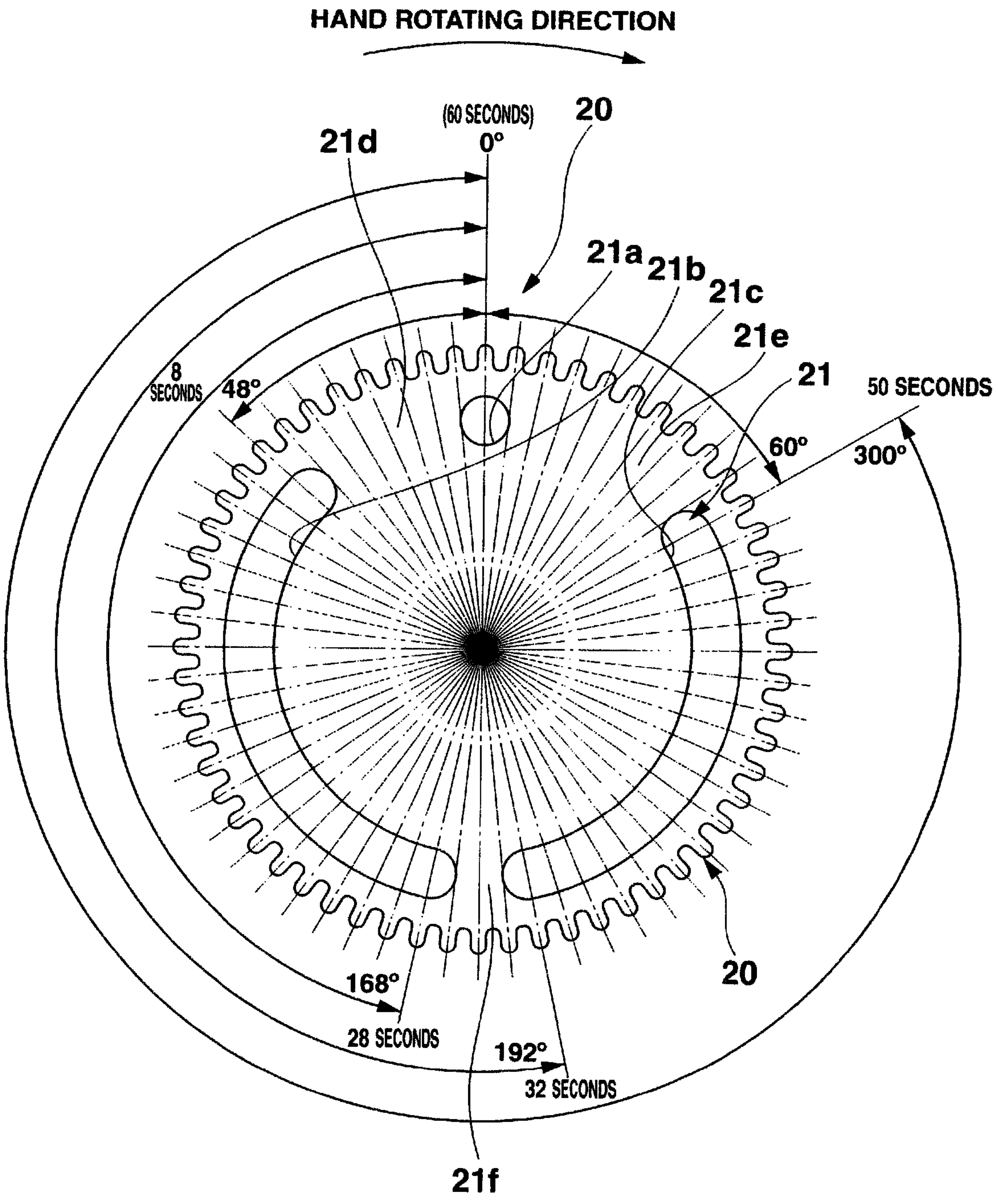
FIG. 6 is an enlarged view showing, in enlarged scale, the second wheel shown in FIG. 5.

In this case, as shown in FIG. 6, the first light transmission hole portion 21 of the second wheel 20 includes a first circular hole 21*a* which is a standard hole provided at a standard position (0°) of the second wheel 20; second and third elongated holes 21*b* and 21*c* which are provided on both sides of the first circular hole 21*a*, that is, on both the hand rotating direction side of the second hand 2 and the opposite direction side thereof with respect to the first circular hole 21*a*, with first and second high-blocking portions 21*d* and 21*e* having different distances being interposed; and a third light-blocking portion 21*f* which is positioned on a diagonal of the first circular hole 21*a* between the second and third elongated holes 21*b* and 21*c*.

As shown in FIG. 6, the first circular hole 21*a* is formed to have a hole diameter of about 0.3 to 0.4 mm, (a width of about 12° relative to the circumference of the second wheel 20), taking into account the diameter of about 3 to 5 mm of the second wheel 20. Of the second and third elongated holes 21*b* and 21*c*, the second elongated hole 21*b* is formed, as shown in FIG. 6, in an arcuate shape corresponding to the rotational movement locus of the first circular hole 21*a* from an approximately 48° position (8-step position, i.e. 8-second position) in a counterclockwise direction, with the center of the first circuit hole 21*a* being set as a standard (0°), to an approximately 168° position (28-step position, i.e. 28-second position).

The third elongated hole 21*c*, as shown in FIG. 6, is formed in an arcuate shape corresponding to the rotational movement locus of the first circular hole 21*a* from an approximately 192° position (32-step position, i.e. 32-second position) in the counterclockwise direction, with the center of the first circuit hole 21*a* being set as the standard (0°), to an approximately 300° position (50-step position, i.e. 50-second position). In this case, of the first and second light-blocking portions 21*d* and 21*e*, the first light-blocking portion 21*d*, which is positioned on the side (the counterclockwise side in FIG. 6) opposite to the hand rotating direction side of the second hand 2, is provided, as shown in FIG. 6, with an interval of about three times the diameter (12° width) of the first circular hole 21*a*, that is, with a width interval of substantially about 36° in a range from the standard position (0° position) that is the center of the first circular hole 21*a* to an about 48° position (8-step position, i.e. 8-second position) counterclockwise.

The second light-blocking portion 21*e*, which is positioned on the hand rotating direction side of the second hand 2, is provided with an interval which is longer than the interval of the first light-blocking portion 21*d* by a distance corresponding to the diameter of the first circular hole 21*a*, that is, about four times the diameter of the first circular hole 21*a*, to be more specific, with a width interval of substantially about 48° in a range from the standard position (0° position) that is the center of the first circular hole 21*a* to an about 60° position (50-step position, i.e. 50-second position) clockwise The third light-blocking portion 21*f*, as shown in FIG. 6, is formed to have substantially the same size as the diameter of the first circular hole 21*a*, and the third light-blocking portion 21*f* is positioned on the diagonal of the first circular hole 21*a* between the second and third elongated holes 21*b* and 21*c*.

The first light-blocking portion 21*d* corresponds to a part of the third elongated hole 21*c* that is located on a diagonal of the first light-blocking portion 21*d*. The second light-blocking portion 21*e* corresponds to a part of the second elongated hole 21*b* that is located on a diagonal of the second light-blocking portion 21*e*. The third light-blocking portion 21*f* corresponds to the first circular hole 21*a* that is located on a diagonal of the third light-blocking portion 21*f*. Accordingly, the second wheel 20 is configured such that if the second wheel 20 rotates over 180° (half rotation) in the state in which any one of the first to third light-blocking portions 21*d* to 21*f* corresponds to the detection position P of the position detector 13 (the position where the light emitting device 31 and light receiving device 32 are opposed to each other), any one of the first circular hole 21*a* and second and third elongated holes 21*b* and 21*c* necessarily corresponds to the detection position P of the position detector 13.

Figure 7:
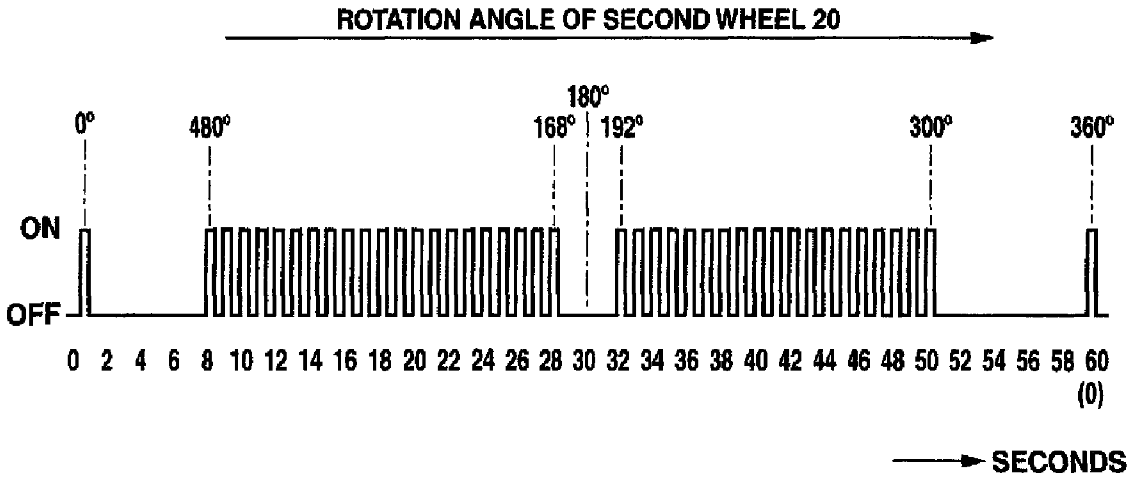
FIG. 7 shows a signal pattern which is obtained by the combination of the light emitting unit and light detecting unit via a plurality of light transmission holes including a standard position light transmission hole in the second wheel while the second wheel shown in FIG. 6 is being rotated.

The second wheel 20 rotates in units of one step (rotation angle=6° rotation time=1 second). When the position detector 13 performs detection in every two seconds (2 steps) while the second wheel 20 rotates by 60 steps (rotation angle=360°: rotation time=60 seconds), a detection pattern as shown in FIG. 7 is obtained by the detector 13. Specifically, when the second wheel 20 is at a 0-second position (0°), the position detector 13 detects the first circular hole 21*a*. When the second wheel 20 is between a 2-second position (12°) and a 6-second position (36°), the position detector 13 is blocked by the first light-blocking portion 21*d*, and an undetection state, in which no light is detected by the position detector 13, continues three times.

When the second wheel 20 is between an 8-second position (48°) and a 28-second position (168°), the position detector 13 continuously detects the second elongated hole 21*b*. When the second wheel 20 is at a 30-second position (180°), the detector 13 is blocked by the third light-blocking portion 21*f*, and there comes an undetection state in which no light can be detected by the position detector 13. When the second wheel 20 is between a 32-second position (192°) and a 50-second position (300°), the position detector 13 continuously detects the third elongated hole 21*c*. When the second wheel 20 is between a 52-second position (312°) and a 58-second position (348°), the position detector 13 is blocked by the second light-blocking portion 21*e*, and an undetection state, in which no light can be detected by the position detector 13, continues four times.

On the other hand, as shown in FIG. 5, the second light transmission hole portion 28 of the minute wheel 25 is a single circular hole which is provided at the standard position (0°) of the minute wheel 25. The circular hole of the second light transmission hole portion 28 has substantially the same size as the first circular hole 21*a* of the second wheel 20, and is provided at a position corresponding to the first circular hole 21*a* of the second wheel 20. The third light transmission hole portion 29 of the hour wheel 27 comprises eleven circular holes which are provided at intervals of 30° along the circumference from the standard position (0°) of the hour wheel 27. As shown in FIG. 5, a fourth light-blocking portion 29*a* is provided between the circular hole at the standard position and the eleventh circular hole, that is, at an eleven o'clock position.

The fourth light transmission hole portion 30 of the intermediate wheel 23, as shown in FIG. 5, is a single circular hole which corresponds to the single circular hole that is the second light transmission hole portion 28 of the minute wheel 25. The circular hole of the fourth light transmission hole portion 30 has substantially the same size as each of the first circular hole 21*a* of the second wheel 20 and the circular hole that is the second light transmission hole portion 28 of the minute wheel 25. Thereby, the intermediate wheel 23, minute wheel 25 end hour wheel 27 of the second driving system 12 are configured such that all the second to fourth light transmission hole portions 28 to 30 overlap a, the detection position P of the position detector 13 every hour on the hour of the hour hand 4 (0 o'clock, one o'clock, two o'clock, three o'clock, four o'clock, five o'clock, six o'clock, seventh o'clock, eight o'clock, nine o'clock, ten o'clock, and eleven o'clock), except the eleven o'clock position.

Figure 9:
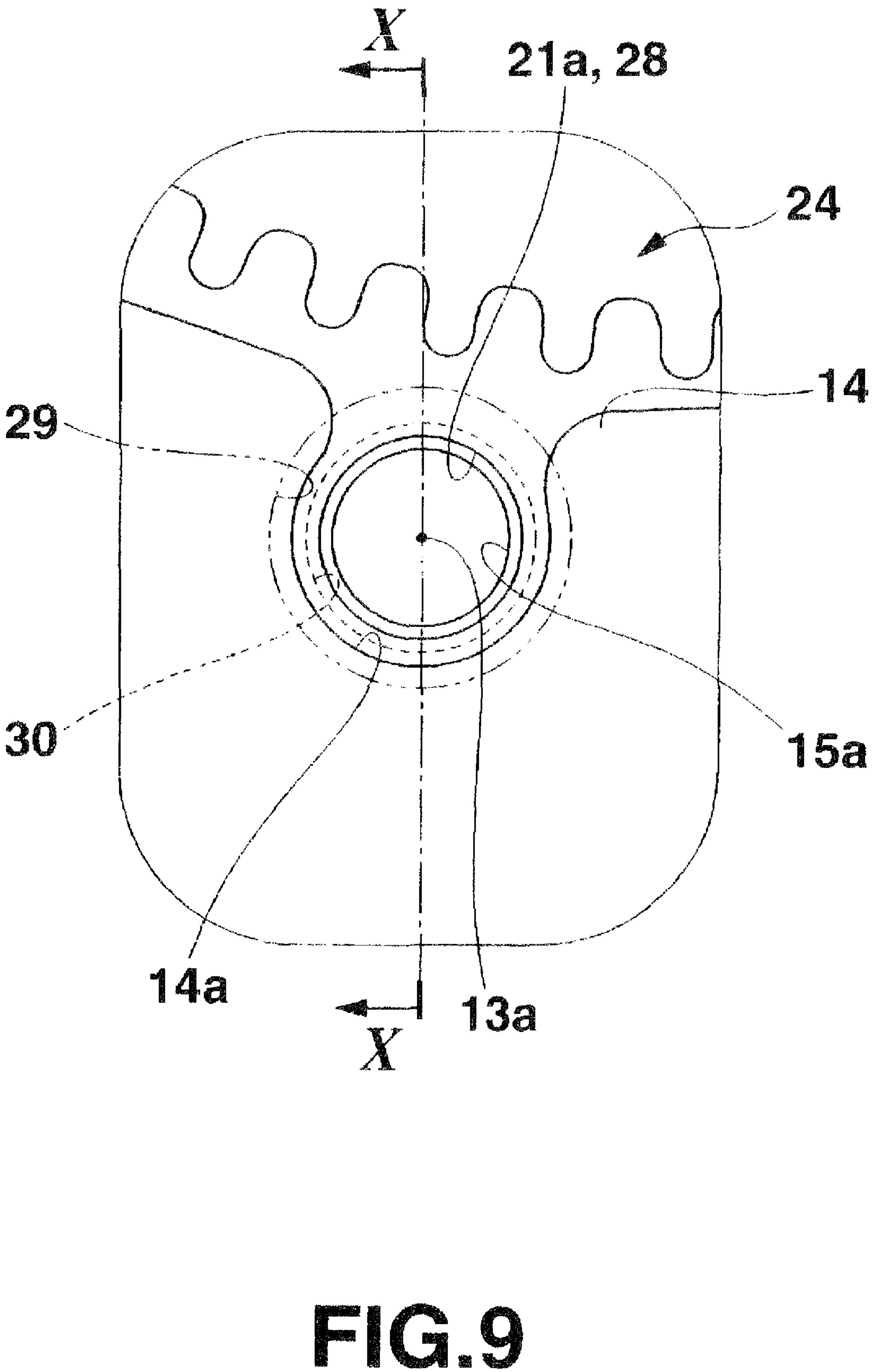
FIG. 9 shows, in enlarged scale, the standard position light transmission holes of the second wheel, minute wheel, hour wheel and intermediate wheel of the second driving system for the minute wheel and hour wheel, which are disposed at the standard positions in FIG. 4, together with a light transmission restriction hole of a light transmission restriction unit of the optical-type rotational body position detection apparatus according to the embodiment of the invention.

As shown in FIG. 9 and FIG. 10, the hand position detection apparatus is configured such that the detection position P of the position detector 13 is provided at a location where all the second wheel 20, minute wheel 25 and hour wheel 27 overlap and the third wheel 24 is nearby, and such that the first to fourth light transmission hole portions 21 and 28 to 30 overlap on the optical axis 13*a* of the detection position P and the detection position P is provided at a position corresponding to an opening portion 34*a* of the minute wheel hold plate 34, an opening portion 14*a* of the main plate 24 and a light leak restriction hole 15*a* that is an opening portion of the train wheel bridge 15.

The hand position detection apparatus is thus configured to detect the rotation positions of the second wheel 20, minute wheel 25 and hour wheel 27 when the light from the light emitting device 31 of the position detector 13 is transmitted through all the first to fourth light transmission hole portions 21 and 28 to 30, the opening portion 34*a* of the minute wheel hold plate 34, the opening portion 14*a* of the main plate 14 and the light leak restriction hole 15*a* of the train wheel bridge 15, and is received by the light receiving device 32.

In this case, as shown in FIG. 10, the light emitting device 31 is provided on the lower surface of the support board 33 that is provided under the upper housing 6. Specifically, a pair of electrodes 33*a* and 33*b* is provided on the lower surface of the support board 33. An upper side electrode of the light emitting device 31 is disposed on and connected to one electrode 33*a*, and a lower side electrode of the light emitting device 31 is connected to the other electrode 33*b* over a lead line 33*c*. In this state, the light emitting device 31 is covered with a mold resin 33*d*. The light emitting device 31 is configured such that the mold resin 33*d* is inserted in the opening portion 34*a*, which is provided in the minute wheel hold plate 34, and is disposed near the hour wheel 27 that is positioned thereunder.

The light receiving device 32, as shown in FIG. 10, is provided in an attachment recess portion 10*a* of the circuit board 10 that is provided on the lower housing 7, such that the light receiving device 32 is opposed to the light emitting device 31. Specifically, a pair of electrodes 10*b* and 10*c* is provided on the upper surface of the circuit board 10. A lower side electrode of the light receiving device 32 is disposed on and connected to one electrode 10*b*, and an upper side electrode of the light receiving device 32 is connected to the other electrode 10*c* over a lead line 10*d*. In this state, the light receiving device 32 is covered with a mold resin 10*e*.

The light receiving device 32 is configured in the following fashion. As shown in FIG. 10, the mold resin 10*e* protrudes to the upper side of the circuit board 10, and the protruding part of the mold resin is inserted in a receiving recess portion 15*b* which is provided in the lower surface of the train wheel bridge 15. The protruding part of the mold resin 10*e* is disposed close to the light leak restriction hole 15*a* of the train wheel bridge 15.

Thereby, in the position detector 13, as shown in FIG. 9 and FIG. 10, the detection position P is provided on the optical axis 13*a* which connects the centers of the light emitting device 31 and light receiving device 32. Specifically, as shown in FIG. 9 and FIG. 10, the detection position P is configured to be a columnar space region having a center axis corresponding to the optical axis 13*a*, and the diameter of the columnar space region is substantially equal to the diameter of the light leak restriction hole 15*a* of the train wheel bridge 15, which will be described later.

The main plate 14, as shown in FIG. 10, is fixed between the hour wheel 27 and minute wheel 25, and is provided with the opening portion 14*a* in which the third wheel 24 that is near the detection position P is rotatably disposed. The main plate 14 is configured such that the main plate 14, together with the train wheel bridge 15, rotatably supports the hour wheel 27, minute wheel 25 and third wheel 24 in the state in which the hour wheel 27, minute wheel 25 and third wheel 24 are disposed close to each other without being put in contact. The train wheel bridge 15 is fixed between the circuit board 10 and the second wheel 20 and is configured such that the train wheel bridge 15, together with the main plate 14, rotatably supports the hour wheel 27, intermediate wheel 23 and second wheel 20 in the state in which the hour wheel 27, intermediate wheel 23 and second wheel 20 are disposed close to each other without being put in contact.

In the meantime, as shown in FIG. 9 to FIG. 10, the second wheel 20, minute wheel 25, hour wheel 27 and intermediate wheel 23 are configured such that at the standard position (the position of 0 hour; 0 minute: 0 second) the first to fourth light transmission hole portions 21 and 28 to 30 (overlap the opening portion 34*a* of the minute wheel hold plate 34, the opening portion 14*a* of the main plate 14 and the light leak restriction hole 15*a* of the train wheel bridge 15, which are positioned at the detection position P of the detector 13.

Figure 11:
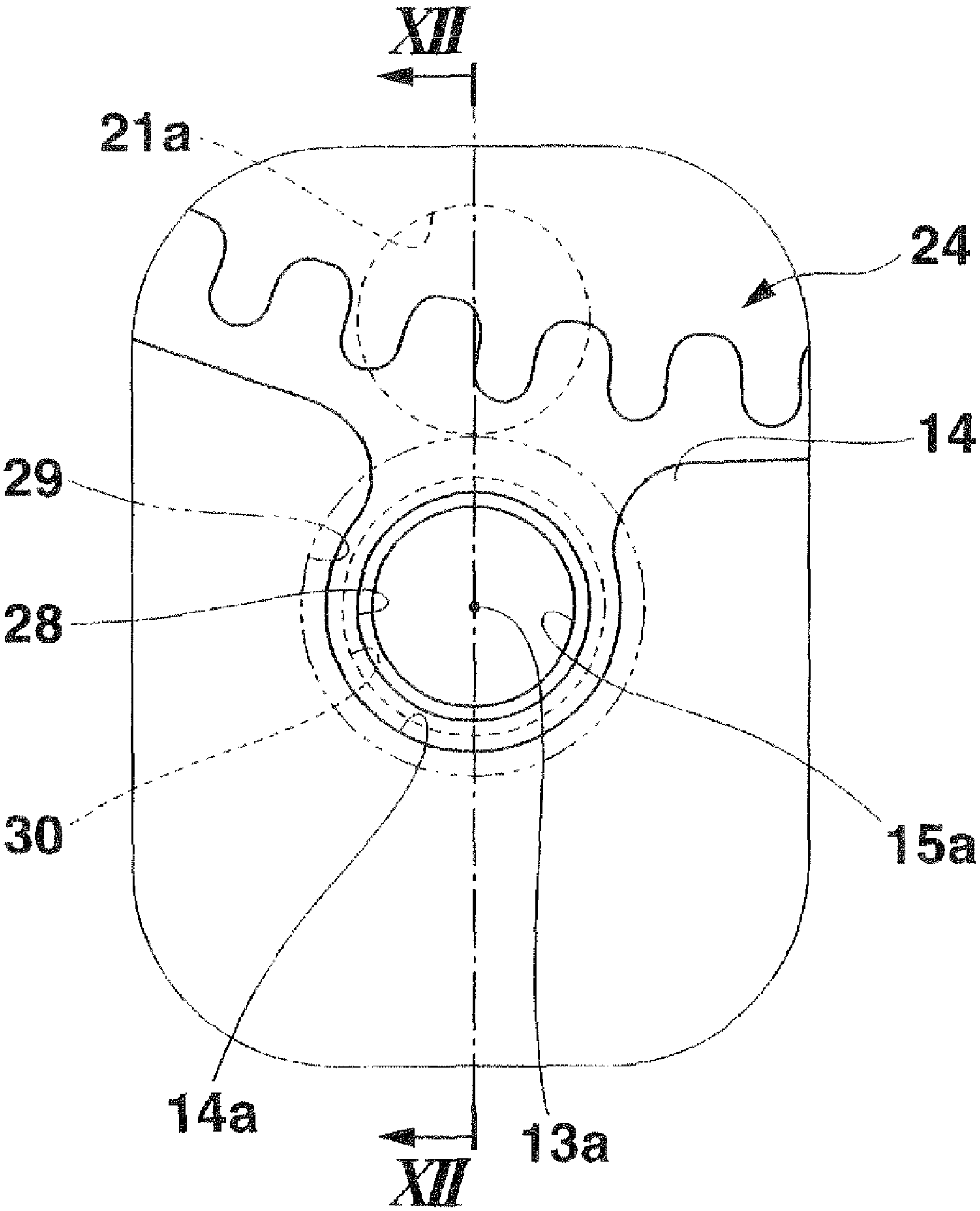
FIG. 11 shows, in enlarged scale, the state in which the standard position light transmission hole of the second wheel is moved away from the other standard position transmission holes and the light transmission restriction hole of the night transmission restriction unit, after the rotation of the second wheel over a predetermined rotation angle of a single predetermined time interval in FIG. 9.
Figure 12:
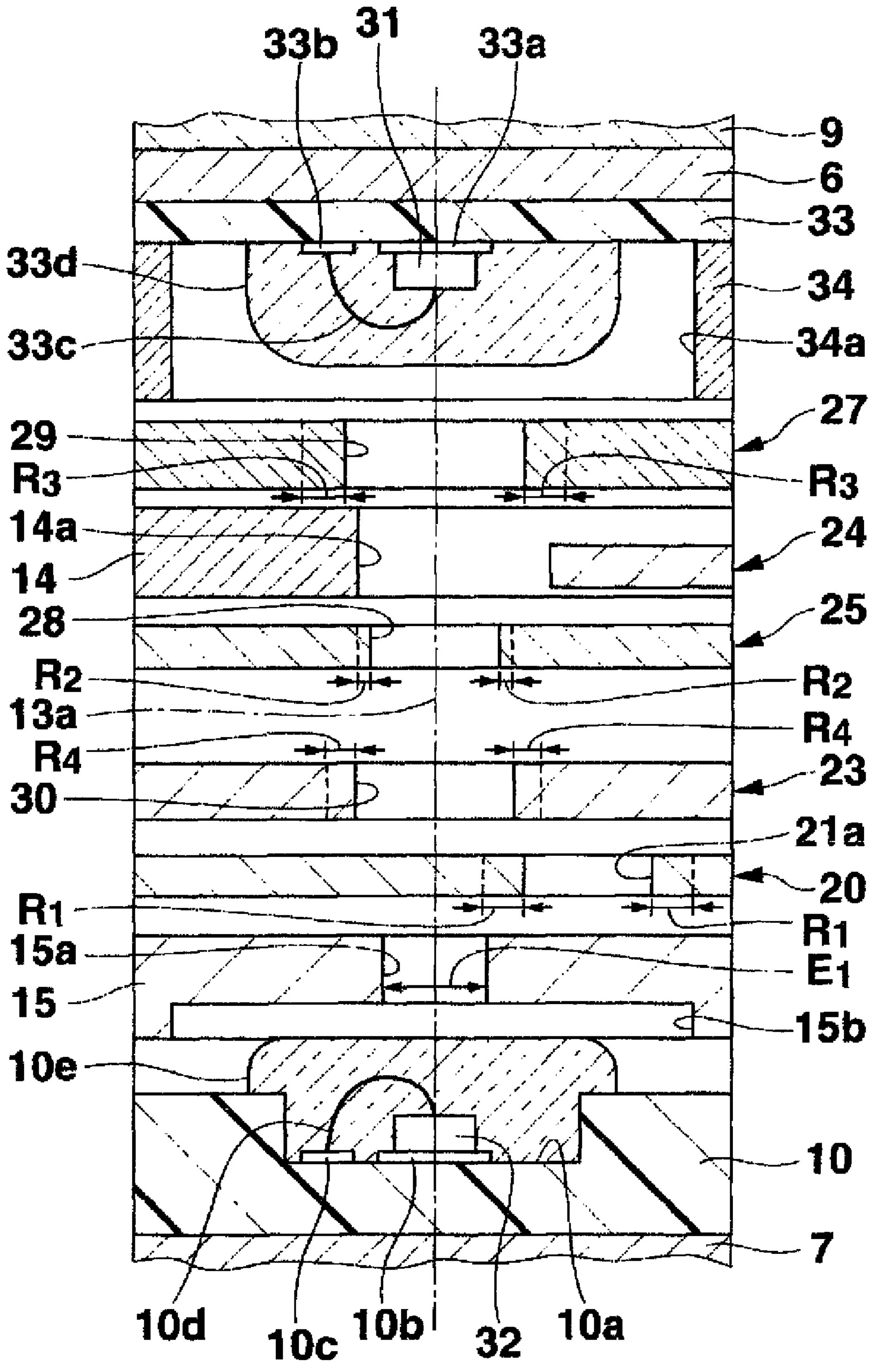
FIG. 12 is an enlarged vertical cross-sectional view, taken along line XII-XII in FIG. 11, of a part of the time-piece module of FIG. 2 in the state of FIG. 11.

As regards the second wheel 20, minute wheel 25, hour wheel 27 and intermediate wheel 23, if the second wheel 20 rotates from the standard position (0°: 0 second) by two steps (12°: 2 seconds), as shown in FIG. 11 and FIG. 12, the first circular hole 21*a* that is the standard hole of the first light transmission hole portion 21 is substantially completely apart from the detection position P of the detector 13, and the second wheel 20 is configured to block the light from the light emitting device 31.

Figure 8:
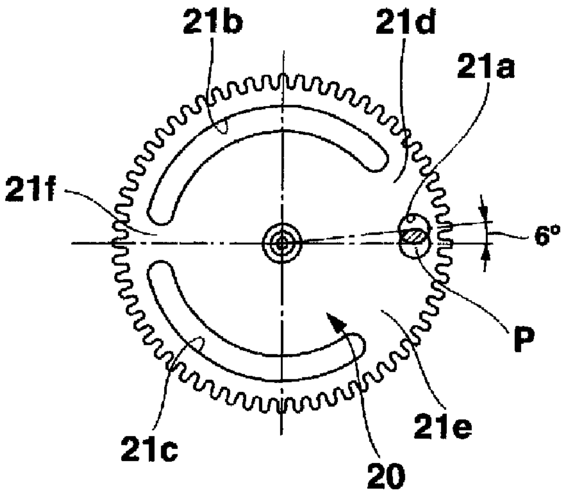
FIG. 8 schematically shows the state in which the standard position light transmission hole of the second wheel shown in FIG. 6 has been rotated and moved from the optical axis between the light emitting unit and light detecting unit in accordance with the rotation of the second wheel of FIG. 6 over a predetermined rotation angle of a single predetermined time interval.

In this case, if the second wheel 20 rotates from the standard position (0°: 0 second) by one step (6°: 1 second), as shown in FIG. 8, the first circular hole 21*a* that is the standard hole does not completely apart from the detection position P of the position detector 13, and about half the light from the light emitting device 31 passes through the first circular hole 21*a* and is received by the light receiving device 32. Thus, the position detector 13 is configured to execute light detection each time the second wheel rotates by two steps, when the position detector 13 detects the rotation position of the second wheel 20.

Figure 13:
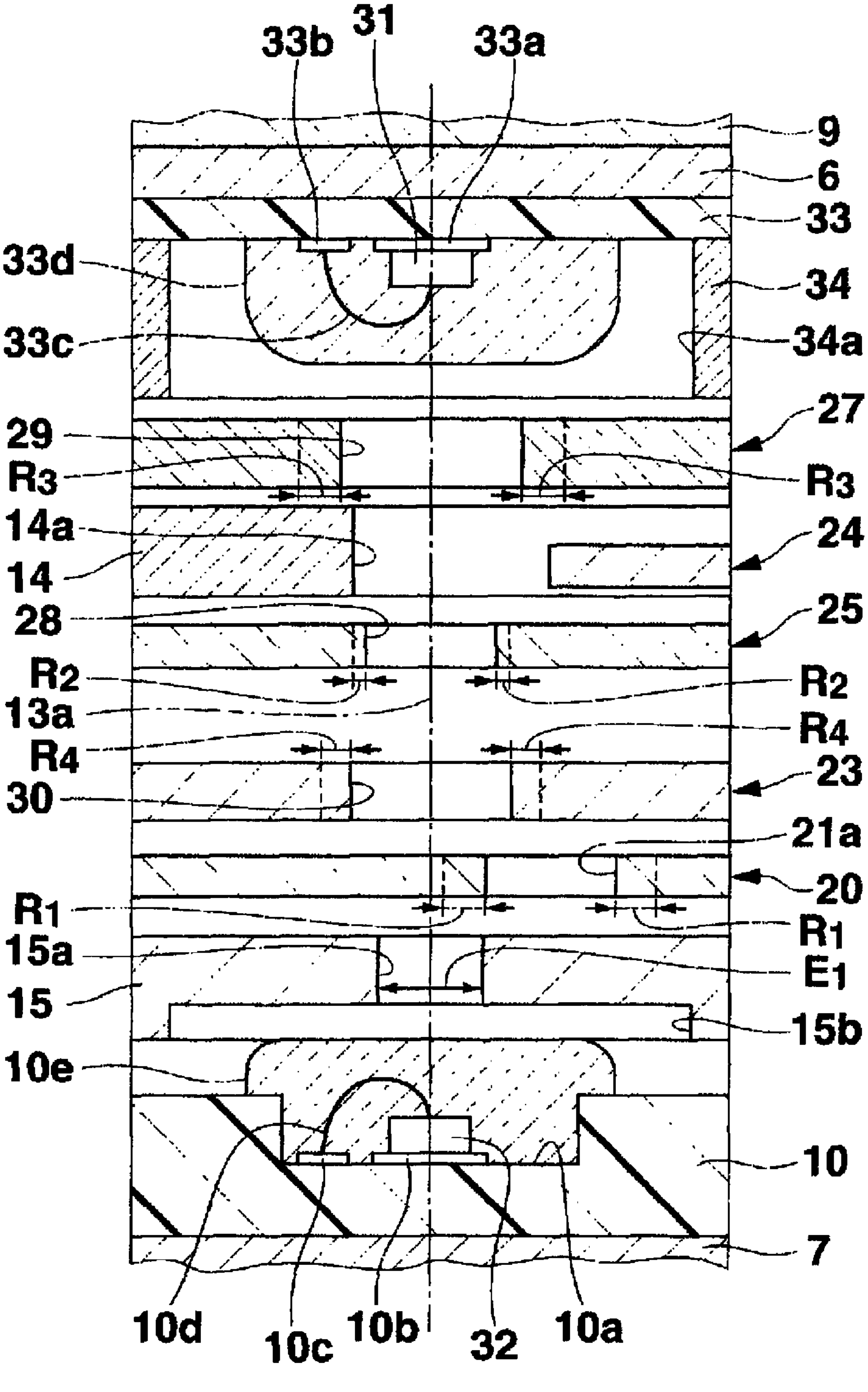
FIG. 13 shows, in enlarged scale as in FIG. 11, the state in which the standard position light transmission hole of the second wheel is moved away from the other standard position transmission holes and the light transmission restriction hole of the light transmission restriction unit, after the second wheel is rotated, with a rotational movement tolerable error, over a predetermined rotation angle of a single predetermined time interval in FIG. 9.

In the meantime, the light leak restriction hole 15*a* which is provided in the train wheel bridge 15 is configured in the following fashion. When the first circular hole 21*a* that is the standard hole of the second wheel 20 corresponds to the detection position P and the light receiving device 32 receives the light from the light emitting device 31, the second wheel 20 rotates by a minimum angle (12°) at every timing (2 seconds) when the position detector 13 performs light detection, and, as shown in FIG. 12 and FIG. 13, the first circular hole 21*a* rotates to a position where the first circular hole 21*a* is completely apart from the detection position P. The light leak restriction hole 15*a* is configured to prevent light leak from this rotated and moved first circular hole 21*a*.

Specifically, as shown in FIG. 12 and FIG. 13, the light leak restriction hole 15*a* of the train wheel bridge 15 is formed such that a light transmission region E1 thereof, through which light passes, is narrowed by a maximum displacement amount R1, in consideration of the maximum displacement amount R1 in rotational movement of the first circular hole 21*a* which is caused by the rotation of the second wheel 20 when the second wheel 20 rotates by a minimum angle (12°) at every timing (2 seconds) of light detection by the position detector 13 and the first circular hole 21*a* rotates to a position where the first circular hole 21*a* is completely apart from the detection position P. The displacement amount R1 of the first circular hole 21*a* occurs due to the precision in fabrication of the second wheel 20 or back-lash.

Such a displacement amount R1 similarly occurs with respect to the second and third elongated holes 21*b* and 21*c* in the first light transmission hole portion 21 of the second wheel 20. Furthermore, as regards the second to fourth light transmission hole portions 28 to 30 of the minute wheel 25, hour wheel 27 and intermediate wheel 23, displacement amounts R2 to R2 similarly occur. However, the minute wheel 25 of the second driving system 12 rotates by one step (6°) in every one minute, and light detection is performed by the position detector 13 in every one step.

Accordingly, if the minute wheel 25 rotates by one step, the intermediate wheel 23 rotates by 30° in interlock with the rotation of the minute wheel 25. Thereby, even if the second Light transmission hole portion 28 is not completely apart from the detection position P of the position detector 13, the fourth light transmission hole portion 30 of the intermediate wheel 23 moves greatly away from the detection position P, thereby blocking the light from the light emitting device 31 by the intermediate wheel 23. Thus, light detection by the position detector 13 can be performed in every one step (one minute) of the minute wheel 25.

Next, referring to FIG. 14, a description is given of a basic second wheel position detection operation for detecting the standard position ("00" second position) of the second wheel 20.

In this basic second wheel position detection operation, the minute wheel 25, hour wheel 27 and intermediate wheel 23 of the second driving system 12 are ignored. FIG. 14A to FIG. 14M show the correspondence between the rotation position of the second wheel 20 and the detection position P of the position detector 13 when the second wheel 20 rotates in units of two steps (rotation angle: 12°).

Figure 14A:
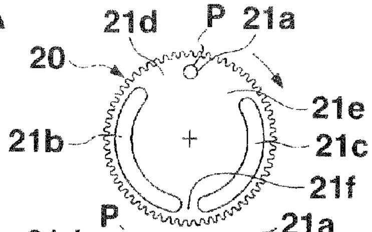

The object of detecting the standard position of the second wheel 20 is to detect the standard position (0°: 0 second) of the second wheel 20 shown in FIG. 14A. That is, the object is to detect the position where the first circular hole 21*a* of the first light transmission hole portion 21 of the second wheel 20 coincides with the detection position P of the position detector 13. The state in which the second wheel 20 is at the standard position is the state of FIG. 14A. In this state, the first circular hole 21*a* of the first light transmission hole portion 21 of the second wheel 20 coincides with the detection position P of the position detector 43, and fight can be detected by the detector 13.

Figure 14B:
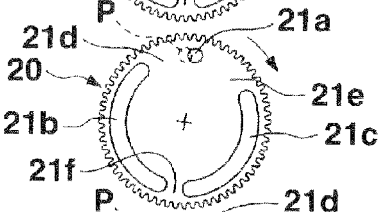
Figure 14C:
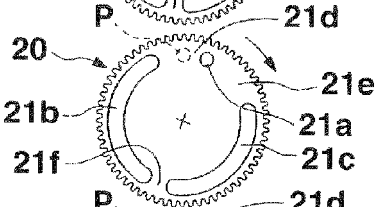
Figure 14D:
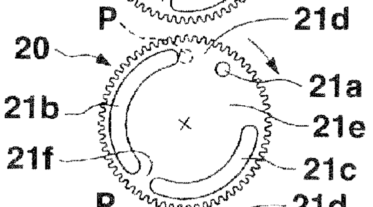

To begin with, if the second wheel 20 rotates by two steps in the state of FIG. 14A and the rotation angle becomes 12°, the first circular hole 21*a* is displaced clockwise from the detection position P, as shown in FIG. 14B, and a part of the first light-blocking portion 21*d* corresponds to the detection position P. Thus, no light can be detected by the position detector 13, and there comes an undetection state as indicated by the 2-second position in FIG. 8. Similarly, until the second wheel, 20 rotates in units of two steps and the rotation angle becomes 36°, as shown in FIG. 14C and FIG. 14D, a part of the first light-blocking portion 21*d* corresponds to the detection position P. Thus, no light can be detected by the detector 13, and the undetection state continues three times, as indicated by the 3-second position to 6-second position in FIG. 6.

Figure 14E:
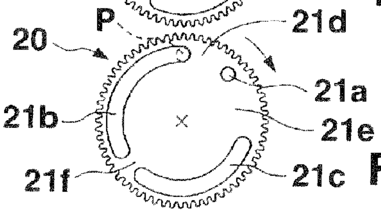
Figure 14F:
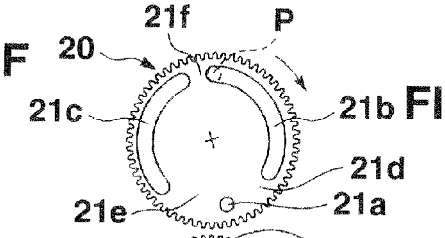

Then, if the second wheel 20 rotates by two steps and the rotation angle becomes 48°, as shown in FIG. 14E, a part of the second elongated hole 21*b* of the first light transmission hole portion 21 of the second wheel 20 corresponds to the detection position P of the position detector 13. Thus, light can be detected by the detector 13, as indicated by the 8-second position in FIG. 6. Similarly, until the second wheel 20 rotates in units of two steps and the rotation angle becomes 168°, as shown in FIG. 14F, a part of the second elongated hole 21*b* corresponds to the detection position P. Thus, light can continuously be detected by the detector 13, as indicated by the 10-second position to 28-second position in FIG. 6.

Figure 14G:
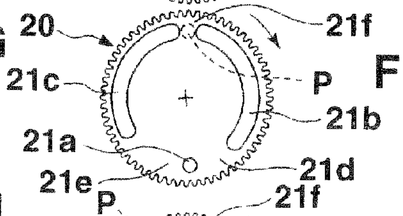
Figure 14H:
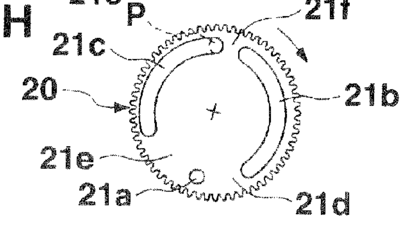

In this state, if the second wheel 20 further rotates by two steps and the rotation angle becomes 180°, as shown in FIG. 14G, the second elongated hole 21*b* is displaced clockwise from the detection position P, and a part of the third light-blocking portion 21*f* corresponds to the detection position P. Thus, no light can be detected by the detector 13, and there comes an undetection state as indicated by the 30-second position in FIG. 6. Then, as shown in FIG. 14H, if the second wheel 20 rotates by two steps and the rotation angle becomes 192°, a part of the third elongated hole 21*c* of the first light transmission hole portion 21 of the second wheel 20 corresponds to the detection position P of the detector 13. Thus, light can be detected by the detector 13, as indicated by the 32-second position in FIG. 6.

Figure 14I:
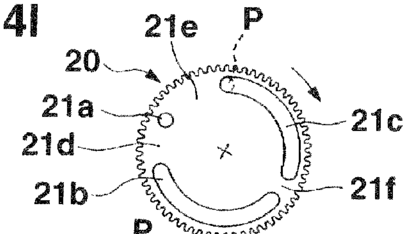
Figure 14J:
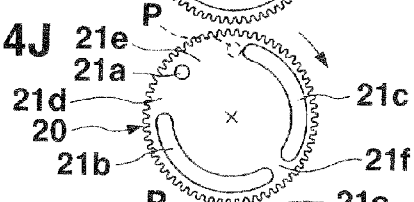

Then, until the second wheel 20 rotates in units of two steps and the rotation angle becomes 300°, as shown in FIG. 14I, a part of the third elongated hole 21*c* corresponds to the detection position P of the detector 13. Thus, light can continuously be detected by the position detector 13, as indicated by the 34-second position to 50-second position in FIG. 6. Then, as shown in FIG. 14J, if the third elongated hole 21*c* is displaced clockwise from the detection position P and a part of the second light-blocking portion 21*e* corresponds to the detection position P, no light can be detected by the detector 13 and there comes an undetection state as indicated by the 52-second position in FIG. 6.

Figure 14K:
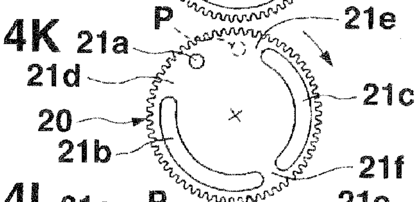
Figure 14L:
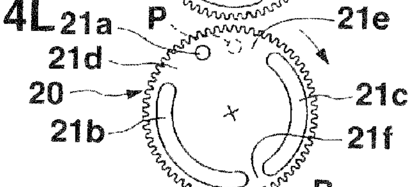
Figure 14M:
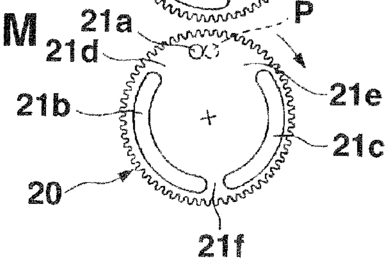

Similarly, until the second wheel 20 rotates in units of two steps and the rotation angle becomes 348°, as shown in FIG. 14K and FIG. 14M, a part of the second light-blocking portion 21*e* corresponds to the detection position P. Thus, no light can be detected by the position detector 13, and the undetection state continues four times, as indicated by the 54-second position to 58-second position in FIG. 6. If the second wheel 20 rotates by two steps in this state and the rotation angle becomes 360°, the first circular hole 21*a* corresponds to the detection position P of the position detector 13, as shown in FIG. 14A. Thus, light can be detected by the detector 13, as indicated by the 0-second position in FIG. 6.

As has been described above, in the state of FIG. 14A, the light is detected by the position detector 13. In the states of FIG. 14B to FIG. 14D, the light cannot be detected by the detector 13 three times in succession. In the states shown in FIG. 14E and FIG. 14F, the light can continuously be detected by the detector 13. In the state of FIG. 14G, no light can be detected by the detector 13. In the states shown in FIG. 14E and FIG. 14I, the light can continuously be detected by the detector 13. In the states of FIG. 14J to FIG. 14M, no light can be detected by the detector 13 four times in succession.

The undetection state in which no light can be detected is the state of FIG. 14B to FIG. 14D and the state of FIG. 14J to FIG. 14M. If attention is paid to these two states, in the case where light detection is executed in units of two steps, the undetection state continues three times in the former and the undetection state continues four times in the latter, and it is understood that the number of times of continuous undetection differs between the former and the latter. By counting the undetection state in which no light can be detected continuously, the standard position can be specified.

Specifically, the light detection for the second wheel 20 is executed in units of two steps (two seconds). If the undetection state continues four times and light detection is successfully executed the next time, the position at which the light detection is executed is the standard position (0°). However, if the undetection state is counted from the state of FIG. 14B, the undetection state continues three times until there comes the state of FIG. 14D, and light can be detected in the following state of FIG. 14E. In this case, since the undetection state does not continue four times, the position at which the light is detected is not the standard position. This is the basic second wheel position detection operation for detecting the standard position of the second wheel 20.

On the other hand, in the basic hand position detection operation for detecting the standard position of the minute wheel 25, as shown in FIG. 3 to FIG. 5, when the minute wheel 25 rotates by one step (6°), the intermediate wheel 23 rotates by 30°. When the minute wheel 25 rotates by 60 steps (360°: one rotation), the second light transmission hole portion 28 of the minute wheel 25 and the fourth light transmission hole portion 30 of the intermediate wheel 23 overlap at the detection position P. If light is detected by the position detector 13 at this time, the minute wheel 25 is at the standard position (0 minute).

In the basic hand position detection operation for detecting the standard position of the hour wheel 27, the third light transmission hole portion 29 of the hour wheel 27, the second light transmission hole portion 28 of the minute wheel 25 and the fourth light transmission hole portion 30 overlap at the detection position P every hour on the hour, except the eleven o'clock position. If light is detected by the detector 13 at this time, it is on the hour, except the eleven o'clock position. At the eleven o'clock position, no light is detected by the detector 13. If light is detected by the detector 13 one hour after eleven o'clock, the hour wheel 27 is at the standard position (0 hour) at the twelve o'clock position.

Figure 15:
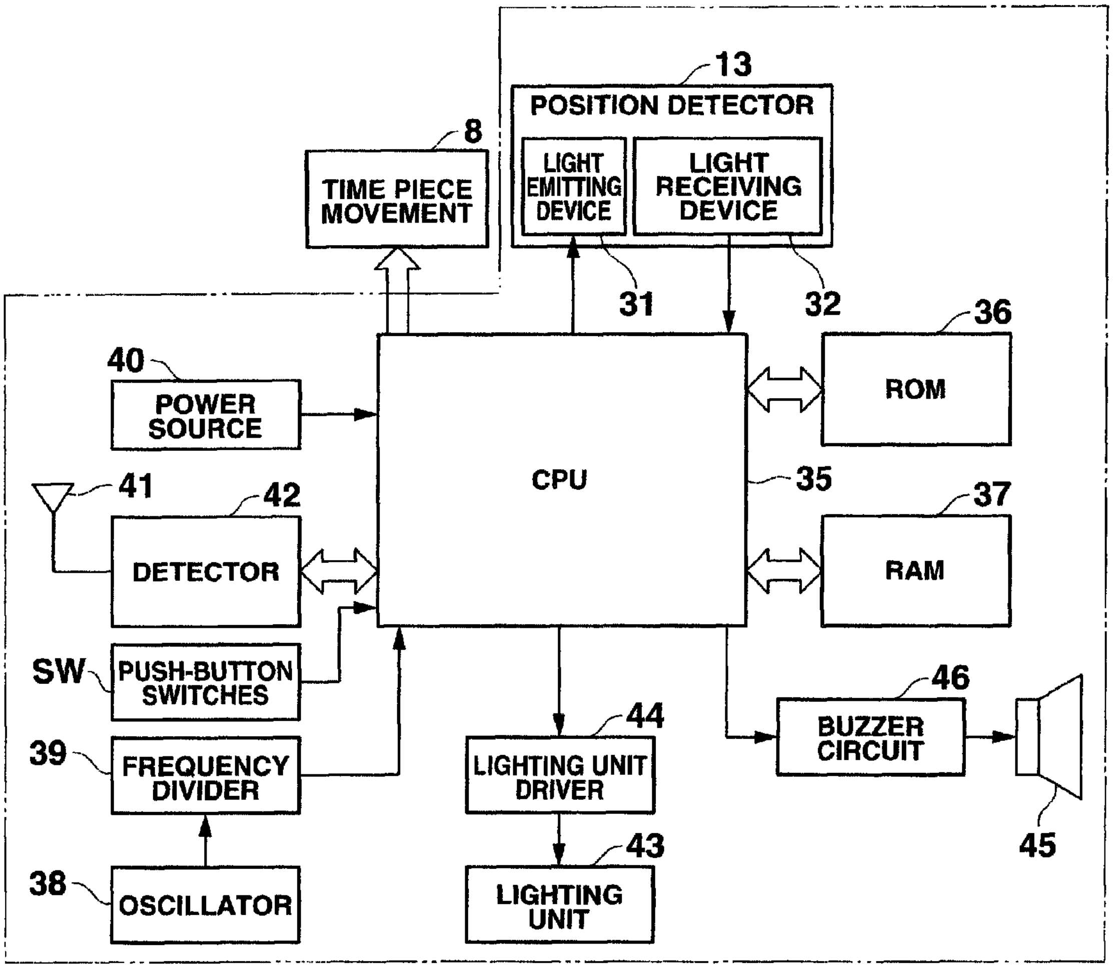
FIG. 15 is a circuit diagram which schematically shows the circuit structure of the hand type wrist watch shown in FIG. 1.

Next, referring to a block diagram of FIG. 15, the circuit structure of the present hand type wrist watch is described.

This circuit structure includes a CPU (central processing unit) 35 which executes an overall circuit control; a ROM (read-only memory) 36 which stores predetermined programs; a RAM (random access memory) 37 which stores process data; an oscillator 38 which generates pulses for operating the CPU 35; and a frequency divider 39 which converts pulses, which are generated by the oscillator 38, to proper frequencies (proper frequencies for operating the CPU 35).

The circuit structure further includes timepiece movement 8 which rotates the hands (second hand 2, minute hand 3 and hour hand 4), and a position detector 13 including a light emitting device 31 which emits light, and a light receiving device 32 which receives light from the light emitting device 31. In this case, the CPU 35 reads out a program which is prestored in them ROM 36, and cutouts predetermined driving pulses to the coils 17*a* and 22*a* of the first and second stepping motors 17 and 22 of the timepiece movement 8.

The circuit structure further includes, in addition to the above components, a power source 40 such as a solar panel 9 or a battery for supplying power; an antenna 41 which receives standard time radio waves; a detector 42 which executes a wave detection process of the received standard time radio waves; a lighting unit 43 which illuminates a time display; a lighting unit driver 44 for driving the lighting unit 43; a speaker 45 which produces sound; a buzzer circuit 46 for driving the speaker 45; and a plurality of button switches SW which selectively switch various modes.

Figure 16:
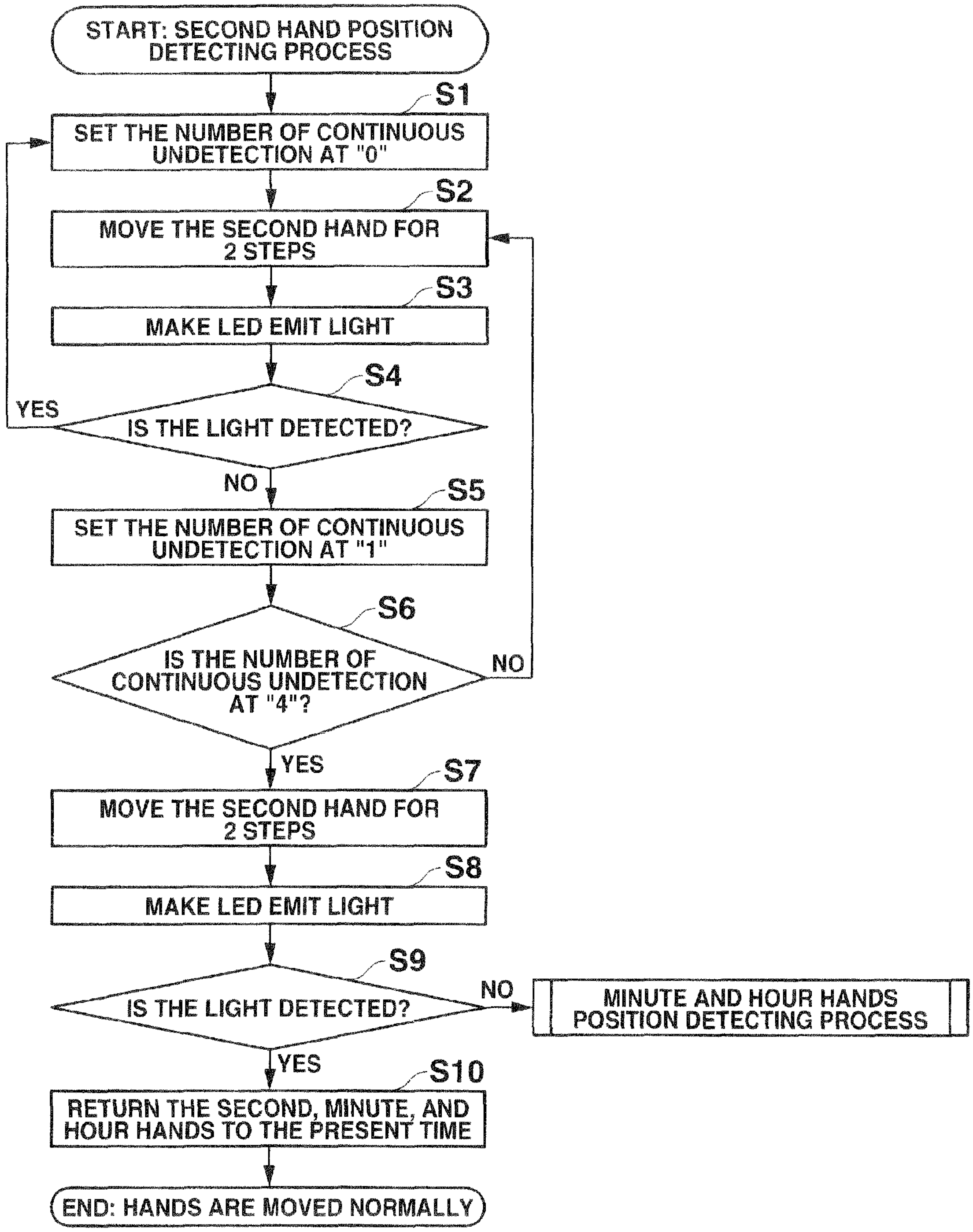
FIG. 16 is a flow chart of the procedure for disposing the second wheel, or a kind of rotational body, in the time-piece module of the hand type wrist watch of FIG. 1 at the standard position by the optical-type rotational body position detection apparatus according to the embodiment of the present invention.

Next, referring to FIG. 16, a description is given of the basic second wheel position detecting process (the basic second hand position detecting process) for detecting the standard position of the second wheel 20 in the present hand type wrist watch.

This basic second wheel position detecting process is a process of detecting the standard position (0°) of the second wheel 20, that is, the position where the first circular hole 21*a* of the first light transmission hole portion 21 of the second wheel 20 coincides with the detection position P of the position detector 13, as shown in FIG. 14A. In this case, it is assumed that the second to fourth light transmission hole portions 28 to 30 of the minute wheel 25, hour wheel 27 and intermediate wheel 23 of the second driving system 12 coincide with the detection position P of the position detector 13, and remain at rest.

If the second wheel position detecting process is started, the number of times of continuous undetection, which has previously been detected by the position detector 13, is cleared, and an undetection flag is set at "0" (step S1). Then, the second wheel 20 is moved by two steps (step S2). The light emitting device 31 of the position detector 13 is made to emit light (step S3), and it is detected whether the light from the light emitting device 31 is received by the light receiving device 32, thereby determining whether light is detected by the position detector 13 or not (step S4).

At this time, in the case where any one of the first circular hole 21*a*, second elongated hole 21*b* and third elongated hole 21*c* of the first light transmission hole portion 21 of the second wheel 20 coincides with the detection position P of the position detector 13 and the light is detected by the detector 13, the second wheel 20 is moved in units of two steps until any one of the first to third light-blocking portions 21*d* to 21*f* of the second wheel 20 comes to correspond to the detection position P of the detector 13, the light from the light emitting device 31 is not received by the light receiving device 32 and there comes an undetection state in which no light is detected by the detector 13.

In step S4, if any one of the first to third light-blocking portions 21*d* to 21*f* of the second wheel 20 corresponds to the detection position P of the detector 13 and there comes the undetection state in which no light is detected by the detector 13, the undetection state is counted as the number of continuous undetection and the undetection flag is set at "1" (step S5). It is then determined whether the undetection state has continued four times or not (step S6).

The reason for this is that if the undetection state continues four times, as shown in FIG. 14J to FIG. 14M, and subsequently light is detected by the detector 13, as shown in FIG. 14A, the position at this time can be specified as the standard position of the second wheel 20. For example, in the state from FIG. 14B to FIG. 14D, since a part of the first light-blocking portion 21*d* of the second wheel 20 corresponds to the detection position P, the number of continuous undetection by the detector 13 is three. However, if the second wheel 20 subsequently rotates by two steps, a part of the second elongated hole 21*b* of the second wheel 20 corresponds to the detection position P and the light is detected by the detector 13. At this time, the process returns to step S2, and the above-described operation is repeated.

Similarly, in the state of FIG. 14G, since the third light-blocking portion 21*f* of the second wheel 20 corresponds to the detection position P of the detector 13, no light is detected by the detector 13. However, if the second wheel 20 subsequently rotates by two steps, a part of the third elongated hole 21*c* of the second wheel 20 corresponds to the detection position P and light is detected by the detector 13. Thus, at this time, too, the process returns to step S2, and the above-described operation is repeated. When the second wheel 20 rotates from the state of FIG. 14J to the state of FIG. 14M, since parts of the second light-blocking portion 21*e* of the second wheel 20 continuously correspond to the detection position P, the undetection by the detector 13 continues four times.

At this time, the second wheel 20 is rotated by two steps (step S7), and the light emitting device 31 of the detector 13 is made to emit light (step S8). To detect whether the light receiving device 32 receives the light of the light emitting device 31 or not, it is judged that whether there is the light detection of the detector 13 or not (step S9). In step S9, if light is detected by the detector 13, the first circular hole 21*a* of the first light transmission hole portion 21 of the second wheel 20 coincides with the detection position P, and it is determined that the second wheel 20 is at the standard position (0°) Thus, transition is made to the normal hand rotation, and the present process is finished.

In this case, in step S9, it is assumed that the second to fourth light transmission hole portions 28 to 30 of the minute wheel 25, hour wheel 27 and intermediate wheel 23 coincide with the detection position P of the detector 13. Therefore, the light detection of the detector 13 is invariably performed. But, in a case if the second to fourth light transmission hole portions 28 to 30 of the minute wheel 25, hour wheel 27 and intermediate wheel 23 do not coincide with the detection position P of the detector 13, the light detection of the detector 13 is not performed, a time and minute hands position detection process will start.

In the hour hand position detecting process, light detection by the detector 13 is executed in units of one step of the minute wheel 25. If light is detected by the detector 13 when the minute wheel 25 has made a single rotation (360°: one minute), it is determined that the minute hand 3 is at the standard position. Besides, if light is detected by the detector 13 when the hour wheel 21 rotates by one hour (30°), except the eleven o'clock position, it is determined that the hour hand 4 is on the hour. If no light is detected by the detector 13 at the eleven o'clock position and subsequently light is detected by the detector 13, it is determined that the hour hand 4 is at the standard position that is the twelve o'clock position.

As has been described above, according to the hand position detection apparatus, in the case of detecting the positions of the second wheel 20, minute wheel 25 and hour wheel 27 by the position detector 13 that includes the light emitting device 31 and light receiving device 32, the light from the light emitting device 31 can be received by the light receiving device 32 through the opening portion 14*a* of the main plate 4 and the light leak restriction hole 15*a* of the strain wheel bridge 15 when the first to fourth light transmission hole portions 21 and 28 to 30 of the second wheel 20, minute wheel 25, hour wheel 27 and intermediate wheel 23 have come to correspond to the detection position P on the optical axis 13*a*.

In this hand position detection apparatus, the detector 13 executes light detection in the state in which the second wheel 20 is rotated by a minimum angle (12°) at a timing of light detection by the detector 13, for example, in units of two seconds (two steps), and the first circular hole 21*a* that is the standard hole is rotated and moved to a position away from the detection position P. In this case, even if the first circular hole 21*a* is not completely apart from the detection position P, leak light from the first circular hole 21*a* can be restricted by the light leak restriction hole 15*a* of the stain wheel bridge 15. Therefore, erroneous detection due to leak light can be prevented at the time of light detection by the detector 13, and thereby the rotational positions of the second wheel 20, minute wheel 25 and hour wheel 27 can exactly be detected.

Specifically, when the second wheel 20 rotates by a minimum angle in accordance with the timing (every two seconds) of light detection by the detector 13 and the first circular hole 21*a* that is the standard hole is rotated and moved to a position that is substantially completely away from the detection position P, even if displacement occurs in the rotational movement of the first circular hole 21*a* of the second wheel 20 due to the precision in fabrication of the second wheel 20 or back-lash, the light leak restriction hole 15*a* can prevent light leak due to such displacement.

To be more specific, the light transmission region E1 of the light leak restriction hole 15*a*, through which light passes, is formed to be narrower by the maximum displacement amount R1, in consideration of the maximum displacement amount R1 in rotational movement of the first circular hole 21*a* which is caused by the rotation of the second wheel 20. Thus, when the second wheel 20 rotates by a minimum angle, even if the first circular hole 21*a* is not sufficiently rotated and moved due to the displacement amount R1 and part of the light from the light emitting device 31 passes through the first circular hole 21*a*, the leak light which has passed can surely be blocked by the light leak restriction hole 15*a* of the strain wheel bridge 15.

In this hand position detection apparatus, the light leak restriction hole 15*a* is a circular through-hole that is provided in the train wheel bridge 15, which rotatably supports, together with the main plate 14, the second wheel 20, intermediate wheel 23 and minute wheel 25, the light leak restriction hole 15*a* being provided at a position corresponding to the detection position P on the optical axis 13*a* that connects the light emitting device 31 and light receiving device 32. Thus, there is no need to use a special member, and the existing structure can be used. Therefore, the optical axis 13*a*, which connects the light emitting device 31 and light receiving device 32, is not made longer, and the entire apparatus can be fabricated in compact size.

In this hand position detection apparatus, the light receiving device 32 of the position detector 13 is disposed in the attachment recess portion 10*a* that is provided in the upper surface of the circuit board 10, and the light receiving device 32 is covered with the mold resin 10*e*. Even though the mold resin 10*e* protrudes to the upper side of the circuit board 10, the protruding portion of the mold resin 10*e* is inserted in the receiving recess portion 15*b* which is provided in the lower surface of the train wheel bridge 15. By this structure, too, the length of the optical axis 13*a*, which connects the light emitting device 31 and light receiving device 32, can be decreased, and the entire apparatus can be reduced in thickness.

In this case, the light emitting device 31 of the detector 13 is disposed on the support substrate 33 that is disposed under the upper housing 6, and is covered with the mold resin 33*d*. The mold resin 33*d* is inserted in the opening portion 34*a*, which is provided in the minute wheel hold plate 34 that is positioned thereunder. By this structure, too, the length of the optical axis 13*a*, which connects the light emitting device 31 and light receiving device 32, can be decreased, and the entire apparatus can be reduced in thickness.

Embodiment 2

Next, referring to FIG. 17 to FIG. 20, a description is given of Embodiment 2 of the hand type wrist watch to which the invention is applied. The same parts as those in the Embodiment 1 shown in FIG. 1 to FIG. 16 are denoted by like reference numerals, and a description thereof is omitted.

In this wrist watch, in addition to the provision of the light leak restriction hole 15*a* of the strain to wheel bridge 15, a light leak restriction hole 50 is also provided in the minute wheel hold plate 34 on the upper housing 6 side. In the other respects, the structure of Embodiment 2 is substantially the same as that of Embodiment 1.

Figure 18:
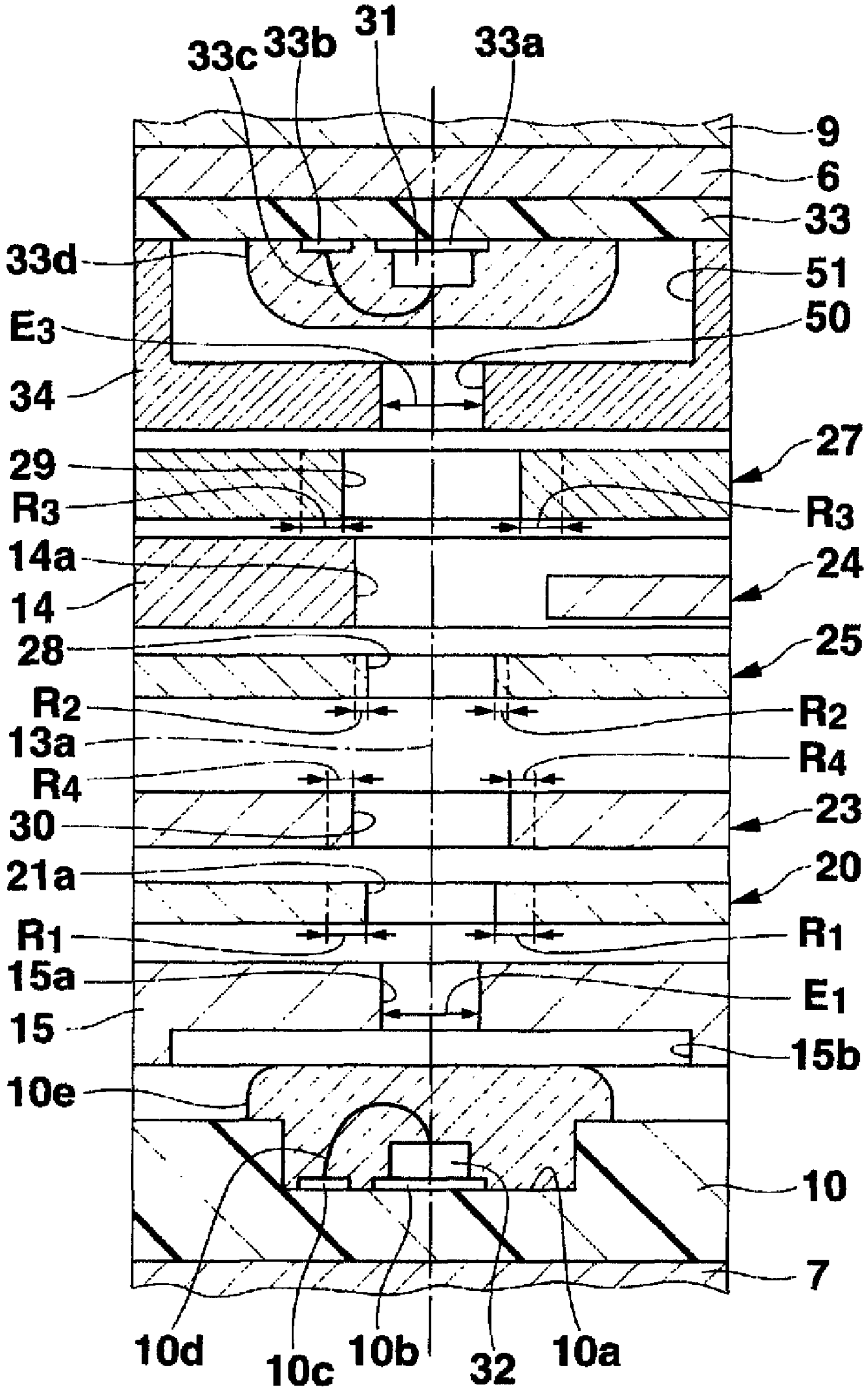
FIG. 18 is a vertical cross-sectional view similar to FIG. 10, taken along line XVIII-XVIII in FIG. 17.
Figure 20:
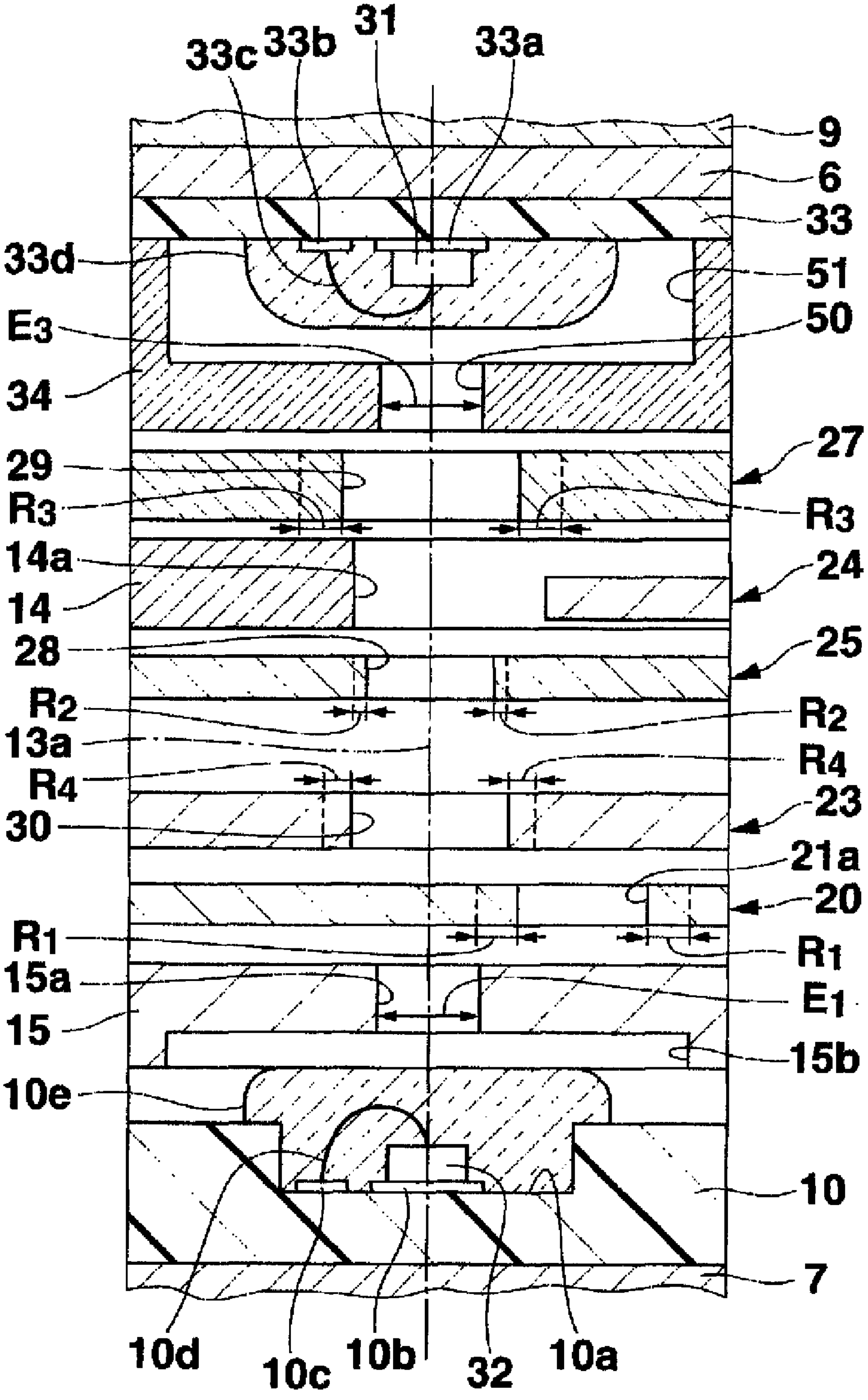
FIG. 20 is a vertical cross-sectional view similar to FIG. 12, taken along line XX-XX in FIG. 19.

In this case, as shown in FIG. 18 and FIG. 20, the support substrate 33 is disposed on the upper side of the minute wheel hold plate 34. Like Embodiment 1, the light emitting device 31 is provided on the lower surface of the support substrate 33. Specifically, like the Embodiment 1, a pair of electrodes 33*a* and 33*b* is provided on the lower surface of the support board 33. An upper side electrode of the light emitting device 31 is disposed on and connected to one electrode 33*a*, and a lower side electrode of the light emitting device 31 is connected to the other electrode 33*b* over a lead line 33*c*. In this state, the light emitting device 31 is covered with a mold resin 33*d*.

A device receiving recess portion 51, in which the mold resin 33*d* is inserted, is provided on the upper side of the minute wheel hold plate 34, near which the light emitting device 31 is disposed, as shown in FIG. 18 and FIG. 20. The minute wheel hold plate 34 at the device receiving recess portion 51 is provided with a light leak restriction hole 50 at a position corresponding to the detection position P of the detector 13. The light leak restriction hole 50 is configured to correspond to the third light transmission hole portion 29 of the hour wheel 27 when the third light transmission hole portion 29 of the hour wheel 27, which is disposed near the lower surface of the minute wheel hold plate 34, has come to correspond to the detection position P.

In this case, the size of a light transmission region E3 of the light leak restriction hole 50 differs between the case in which the displacement amount R1 of the first circular hole 21*a*, which occurs due to the precision in fabrication of the second wheel 20 or back-lash, is greater than a displacement amount R3 of the third light transmission hole portion 29, which occurs due to the precision in fabrication of the hour wheel 27 or back-lash (R1>R3), and the case in which the displacement amount R1 of the first circular hole 21*a* of the second wheel 20 is less than the displacement amount R3 of the third light transmission hole portion 29 of the hour wheel 27 (R1<R3).

For example, in the case where the displacement amount R1 of the first circular hole 21*a* of the second wheel 20 is greater than the displacement amount R3 of the third light transmission hole portion 29 of the hour wheel 27 (R1>R3), the light leak restriction hole 50 is formed in the same fashion as in Embodiment 1. Specifically, the light leak restriction hole 50 in this case (R1>R3) is configured in the following fashion. When the first circular hole 21*a* that is the standard hole of the second wheel 20 corresponds to the detection position P and the light receiving device 32 receives light from the light emitting device 31, the second wheel 20 rotates by a minimum angle (12°) at every timing (2 seconds) of light detection by the position detector 13, and the first circular hole 21*a* rotates to a position where the first circular hole 21*a* is completely apart, from the detection position P. The light leak restriction hole 50 in this case (R1>R3) is configured to prevent light leak from this rotated and moved first circular hole 21*a*.

To be more specific, as shown in FIG. 12 and FIG. 13, the light transmission region E3 of the light leak restriction hole 50, through which light passes, is formed to be narrower by the maximum displacement amount R1, in consideration of the maximum displacement amount R1 in rotational movement of the first circular hole 21*a* which is caused by the rotation of the second wheel 20, when the second wheel 20 rotates by the minimum angle (12°) at every timing (2 seconds) of light detection by the detector 13 and the first circular hole 21*a* rotates to a position where the first circular hole 21*a* is apart from the detection position P.

Figure 17:
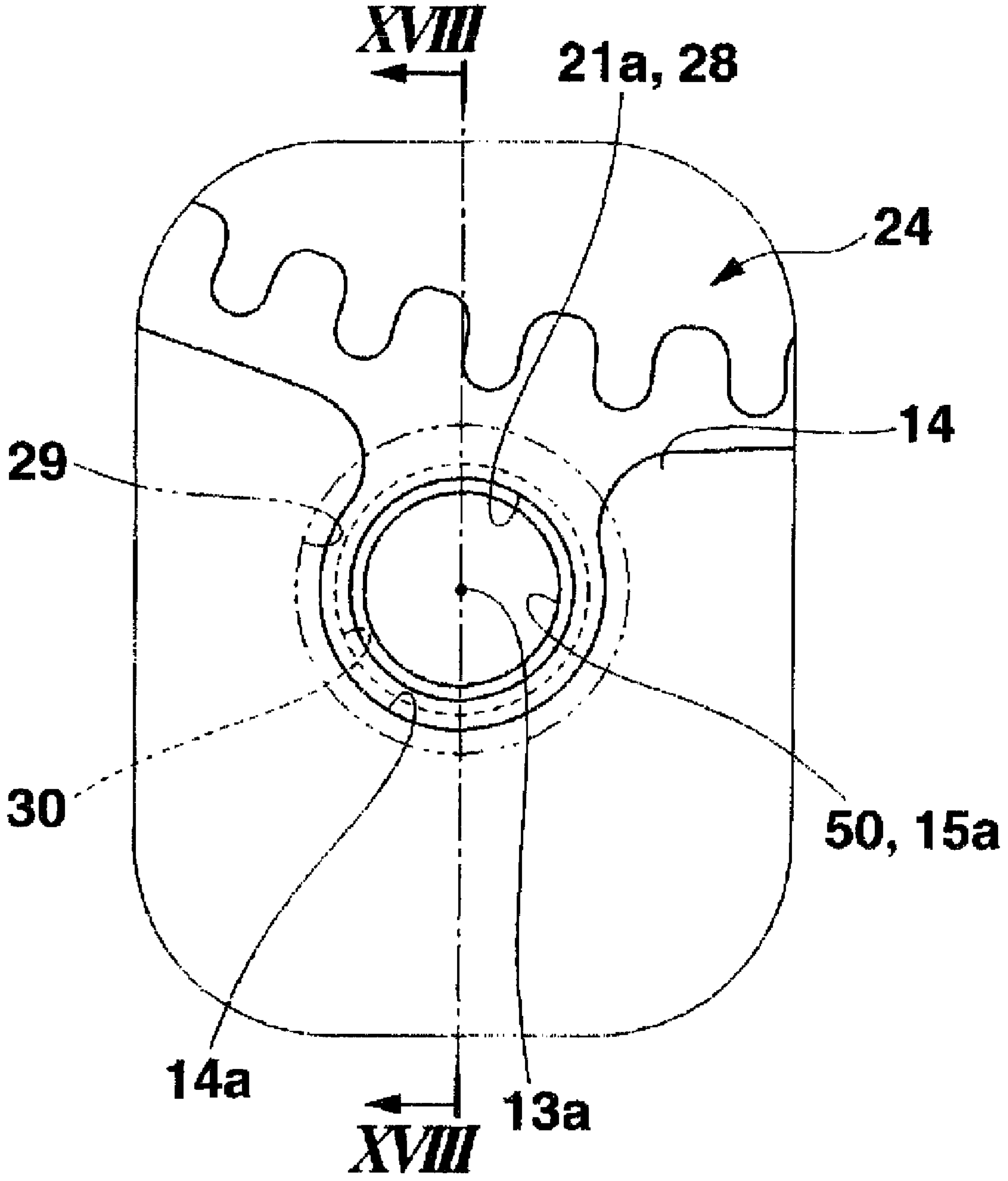
FIG. 17 is an enlarged view similar to FIG. 9, showing a time-piece module of the hand type wrist watch of FIG. 1, which is combined with an optical-type rotational body position detection apparatus according to an embodiment of the invention involving a first modification of the light transmission restriction unit.

On the other hand, in the case where the displacement amount R3 of the third light transmission hole portion 29 of the hour wheel 27 is greater than the displacement amount R1 of the first circular hole 21*a* of the second wheel 20 (R1<53) the light leak restriction hole 50 is formed in accordance with the displacement amount 53 of the third light transmission hole portion 29 of the hour wheel 27. Specifically, as shown in FIG. 17 and FIG. 18, the light leak restriction hole 50 in this case (R1<R3) causes light from the light emitting device 31 to be radiated on the third light transmission hole portion 29, when the third light transmission hole portion 29 of the hour wheel 27 has come to correspond to the optical axis 13*a* at the detection position P.

Figure 19:
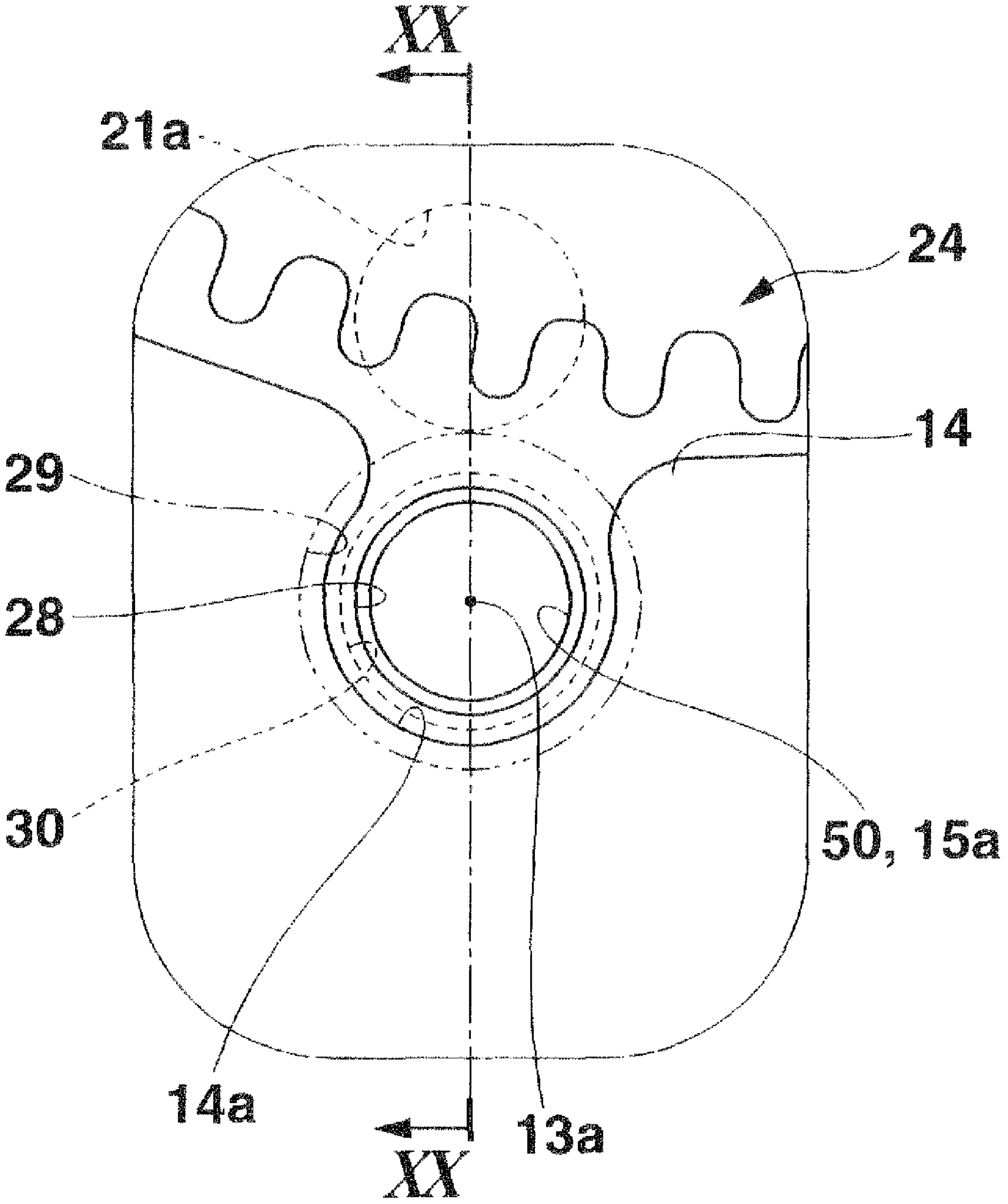
FIG. 19 is an enlarged view similar to FIG. 11, showing the time-piece module of the hand type wrist watch of FIG. 1, which is combined with the optical-type rotational body position detection apparatus according to the embodiment of the invention involving the first modification of the light transmission restriction unit.

In addition, as shown in FIG. 19 and FIG. 20, the light leak restriction hole 50 in this case (R1<R3) is configured such that when the hour wheel 27 rotates by the minimum angle (30°) at every timing (one hour) of light detection by the detector 13 and the third light transmission hole portion 29 rotates to a position where the third light transmission hole portion 29 is completely apart from the detection position P, the light leak restriction hole 50 prevents light from the light emitting device 31 from being radiated on the third light transmission hole portion 29, thus preventing light leak from the third light transmission hole portion 29.

To be more specific, as shown in FIG. 20, the light transmission region E3 of the light leak restriction hole 50, through which light passes, is formed to be narrower by the maximum displacement amount R3, in consideration of the maximum displacement amount R3 in rotational movement of the third light transmission hole portion 29 which is caused by the rotation of the hour wheel 27, when the hour wheel 27 rotates by the minimum angle (30°) at every timing (one hour) of light detection by the detector 13 and the third light transmission hole portion 29 rotates to a position where the third light transmission hole portion 29 is completely apart from the detection position P.

According to this hand position detection apparatus, when the positions of the positions of the second wheel 20, minute wheel 25 and hour wheel 27 are detected by the position detector 13 that includes the light from the light emitting device 31 and the light receiving device 32, the light from the light emitting device 31 can be received by the light receiving device 32 through the light leak restriction hole 50 of the minute wheel hold plate 34, the opening portion 14*a* of the main plate 14 and the light leak restriction hole 15*a* of the train wheel bridge 15 when the first to fourth light transmission hole portions 21 and 28 to 30 of the second wheel 20, minute wheel 25, hour wheel 27 and intermediate wheel 23 have come to correspond to the detection position P on the optical axis 13*a*.

In addition, according to this hand position detection apparatus, like Embodiment 1, in the case where the displacement amount R1 of the first circular hole 21*a* of the second wheel 20 is greater than the displacement amount R3 of the third light transmission hole portion 29 of the hour wheel 27 (R1>R3), when light detection is performed by the detector 13 in the state in which the second wheel 20 rotates by the minimum angle (12°) at the timing, e.g. every two seconds, of light detection by the detector 13 and the first circular hole 21*a* that is the standard hole is rotated and moved to a position that is substantially completely away from the detection position P, even if displacement occurs in the rotational movement of the first circular hole 21, the light leak restriction hole 50 of the minute wheel hold plate 34, together with the light leak restriction hole 15*a* of the train wheel bridge 15, can prevent light leak from the first circular hole 21*a*.

Besides, in the case where the displacement amount R3 of the third light transmission hole portion 29 of the hour wheel 27 is greater than the displacement amount R1 of the first circular hole 21*a* of the second wheel 20 (R1<R3), when light detection is performed by the detector 13 in the state in which the hour wheel 27 rotates by the minimum angle (30°) at the timing, e.g. every one hour, of light detection by the detector 13 and the third light transmission hole portion 29 is rotated and moved to a position that is substantially completely away from the detection position P, even if displacement occurs in the rotational movement of the third light transmission hole portion 29, the light leak restriction hole 50 of the minute wheel hold plate 34, together with the light leak restriction hole 15*a* of the train wheel bridge 15, can prevent light leak from the third light transmission hole portion 29.

Therefore, at the time of light detection by the detector 13, light leak at the third light transmission hole portion 29 of the hour wheel 27 and the first circular hole 21*a* of the second wheel 20 can surely be prevented by the light leak restriction hole 50 of the minute wheel hold plate 34 and the light leak restriction hole 15*a* of the train wheel bridge 15. Thereby, erroneous detection due to leak light can be prevented more surely than in Embodiment 1, and the rotational positions of the second wheel 20, minute wheel 25 and hour wheel 27 can be detected more exactly than in the Embodiment 1.

Figure 21:
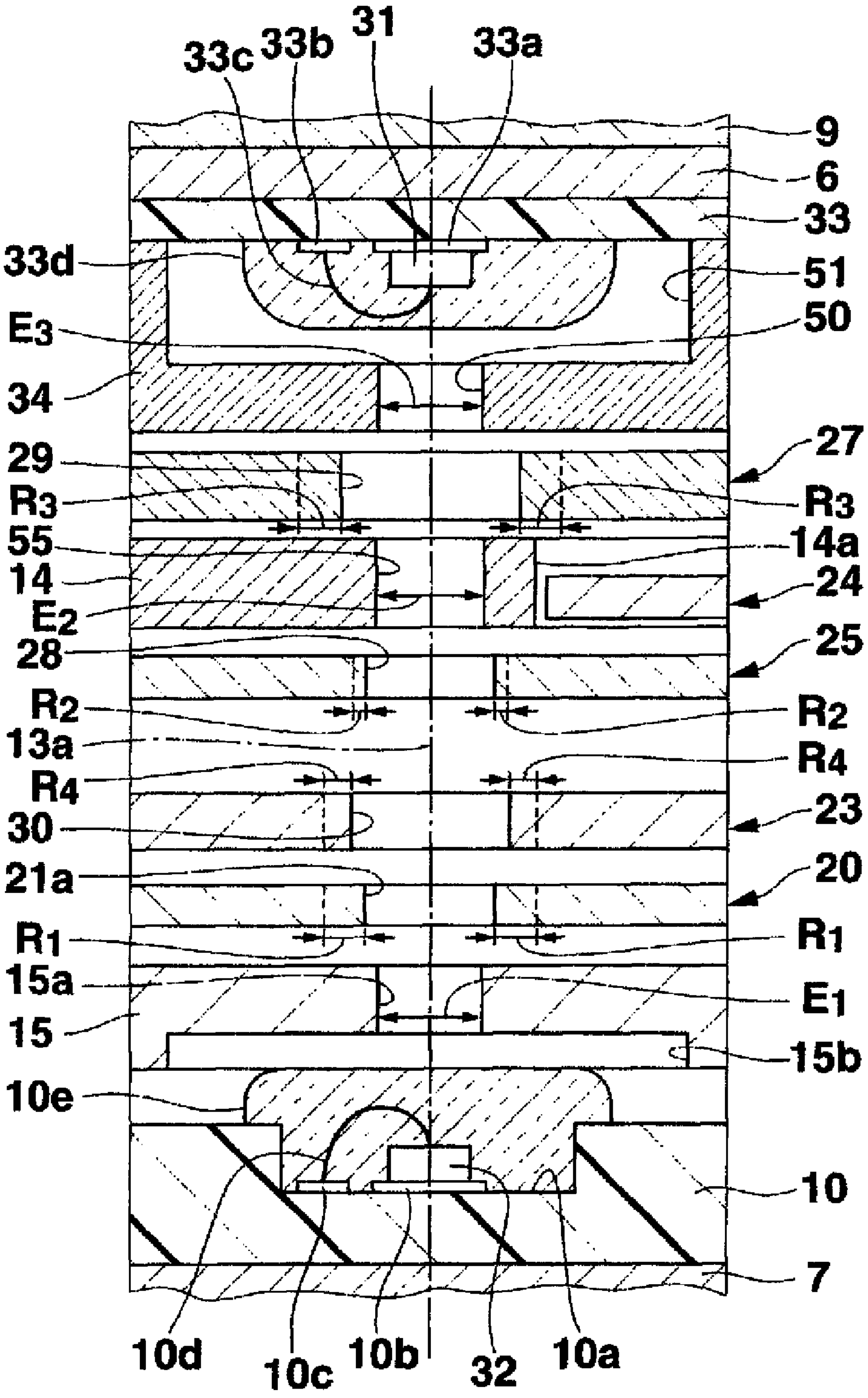
FIG. 21 is a vertical cross-sectional view similar to FIG. 10, showing a time-piece module of the hand type wrist watch of FIG. 1, which is combined with an optical-type rotational body position detection apparatus according to an embodiment of the invention involving a second modification of the light transmission restriction unit.

In Embodiment 2, the description has been given of the case in which the light leak restriction hole 15*a* is provided in the train wheel bridge 15, and the light leak restriction hole 50 is provided in the minute wheel hold plate 34. However, as shown in FIG. 21, for example, such a structure may be adopted that a light leak restriction hole 55 is also provided in the main plate 14. The light leak restriction hole 55 of the main plate 14, as shown in FIG. 21, causes the light, which has passed through the third light transmission hole portion 29, to be radiated on the second light transmission hole portion 28 and fourth light transmission hole portion 30, when the third light transmission hole portion 29 of the hour wheel 27, the second light transmission hole portion 28 of the minute wheel 25 and the fourth light transmission hole portion 30 of the intermediate wheel 23 have come to correspond to the optical axis 13*a* at the detection position P.

The size of a light transmission region E2 of the light leak restriction hole 55 of the main plate 14 differs between the case in which the displacement amount R1 of the first circular hole 21*a*, which occurs due to the precision in fabrication of the second wheel 20 or back-lash, is greater than each of displacement amounts R2 and R4 of the second and fourth light transmission hole portions 28 and 30, which occur due to the precision in fabrication of the minute wheel 25 and intermediate wheel 23 or back-lash (R1>R2, R4), and the case in which the displacement amount R1 of the first circular hole 21*a* of the second wheel 20 is less than each of displacement amounts R2 and R4 of the second and fourth light transmission hole portions 28 and 30 of the minute wheel 25 and intermediate wheel 23 or back-lash (R1<R2, R4).

For example, in the case where the displacement amount R1 of the first circular hole 21*a* of the second wheel 20 is greater than each of displacement amounts R2 and R4 of the second and fourth light transmission hole portions 28 and 30 of the minute wheel 25 and intermediate wheel 23 (R1>R2, R4), the light leak restriction hole 55 is formed in the same fashion as in Embodiment 1. Specifically, the light leak restriction hole 55 in this case (R1>R2, R4) is configured to pass light from the light emitting device 31 when the first circular hole 21*a* that is the standard hole of the second wheel 20 has come to correspond to the detection position P, and to prevent light leak from the first circular hole 21*a* when the second wheel 20 rotates by the minimum angle (12°) at every timing (2 seconds) of light detection by the detector 13 and the first circular hole 21*a* rotates to a position where the first circular hole 21*a* is completely apart from the detection position P.

To be more specific, the light transmission region E2 of the light leak restriction hole 55, through which light passes, is formed to be narrower by the maximum displacement amount R1, in consideration of the maximum displacement amount R1 in rotational movement of the first circular hole 21*a* which is caused by the rotation of the second wheel 20, when the second wheel 20 rotates by the minimum angle (12°) at every timing (2 seconds) of light detection by the detector 13 and the first circular hole 21*a* rotates to a position where the first circular hole 21*a* is apart from the detection position P, as shown in FIG. 12 and FIG. 13.

On the other hand, in the case where each of displacement amounts R2 and R4 of the second and fourth light transmission hole portions 28 and 30 of the minute wheel 25 and intermediate wheel 23 is greater than the displacement amount R1 of the first circular hole 21*a* of the second wheel 20 (R1<R2, R4), the light leak restriction hole 55 is formed in accordance with the displacement amounts R2 and R4 of the second and fourth light transmission hole portions 28 and 30 of the minute wheel 25 and intermediate wheel 23. Specifically, as shown in FIG. 21, the light leak restriction hole 55 in this case (R1<R2, R4) causes light from the light emitting device 31 to be radiated on the second and fourth light transmission hole portions 28 and 30, when the second and fourth light transmission hole portions 28 and 30 of the minute wheel 25 and intermediate wheel 23 have come to correspond to the optical axis 13*a* at the detection position P.

In addition, the light leak restriction hole 55 in this case (R1<R2, R4) is configured in the following fashion. As shown in FIG. 21, the minute wheel 25 rotates by the minimum angle (6°) at every timing (1 step: one minute) of light detection by the detector 13 and the intermediate wheel 23 rotates by the minimum angle (30°). The second light transmission hole portion 28 of the minute wheel 25 is rotated and moved to a position which is slightly displaced from the detection position P, and the fourth light transmission hole portion 30 of the intermediate wheel 23 is rotated and moved to a position which is completely away from the detection position P. The light leak restriction hole 55 in this case (R1<R2, R4) is configured such that even if light from the light emitting device 31 passes through the third light transmission hole portion 29 and second light transmission hole portion 28, the light is blocked by the intermediate wheel 23.

In this case, the light transmission region E2, E4 of the light leak restriction hole 55 of the main plate 14, through which light passes, is formed to be narrower by the maximum displacement amounts R2 and R4, in consideration of the maximum displacement amounts R2 and R4 in rotational movement or the second and fourth light transmission hole portions 28 and 30 which are caused by the rotations of the minute wheel 25 and intermediate wheel 23, when the minute wheel 25 rotates by 60 steps (360°: one rotation) and the second light transmission hole portion 28 rotates and moves to a position near the detection position P and when the intermediate wheel 23 rotates by 30° at every 1 step and the fourth light transmission hole portion 30 rotates and moves to a position near the detection position P.

This hand position detection apparatus is configured such that the light leak restriction hole 15*a* is provided in the train wheel bridge 15 and the light leak restriction hole 50 is provided in the minute wheel hold plate 34, and moreover the light leak restriction hole 55 is provided in the main plate 14. Thus, when the light detection is performed by the detector 13, light leak at the third light transmission hole portion 29 of the hour wheel 27, the second light transmission hole portion 28 of the minute wheel 25, the fourth light transmission hole portion 30 of the intermediate wheel 23 and the first circular hole 21*a* of the second wheel 20 can more surely be prevented by the light leak restriction hole 55 of the main plate 14, the light leak restriction hole 50 of the minute wheel hold plate 34 and the light leak restriction hole 15*a* of the train wheel bridge 15. Thereby, erroneous detection cue to leak light can be prevented more surely than in Embodiment 2, and the rotational positions of the second wheel 20, minute wheel 25 and hour wheel 27 can be detected more exactly than in Embodiment 2.

In the above-described Embodiment 2 and modification thereof, the light leak restriction hole 50 is provided in the minute wheel hold plate 34, and the light leak restriction hole 55 is provided in the main plate 14, in addition to the provision of the light leak restriction hole 15*a* in the train wheel bridge 15. Alternatively, such a structure may be adopted that the light leak restriction hole is provided in any one of the train wheel bridge 15, minute wheel hold plate 34 and main plate 14. With this structure, too, the same advantageous effect as in the Embodiment 1 can be obtained.

Embodiment 3

Figure 22:
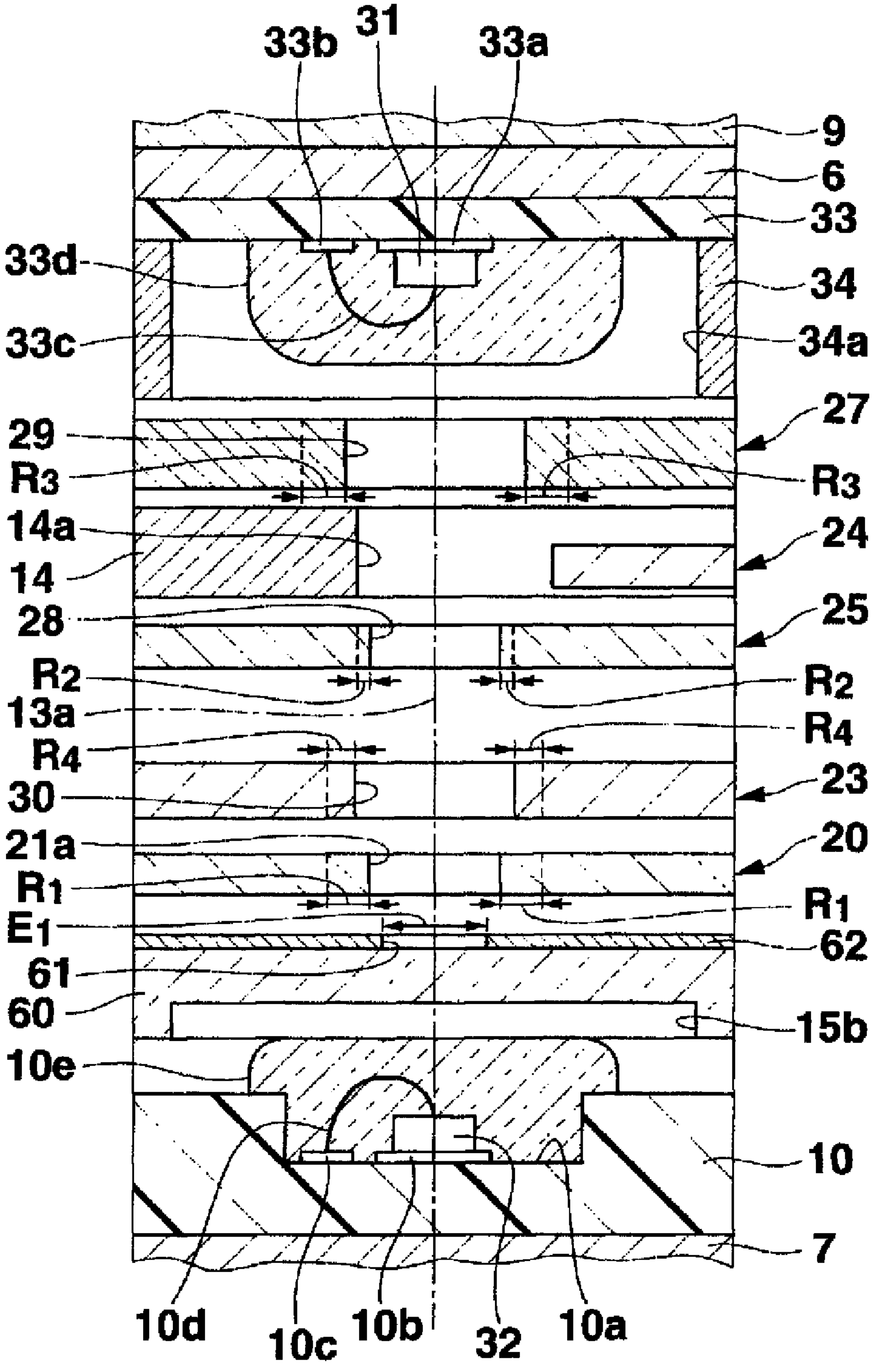
FIG. 22 is a vertical cross-sectional view similar to FIG. 10, showing a time-piece module of the hand type wrist watch of FIG. 1, which is combined with an optical-type rotational body position detection apparatus according to an embodiment of the invention involving a third modification of the light transmission restriction unit.
Figure 23:
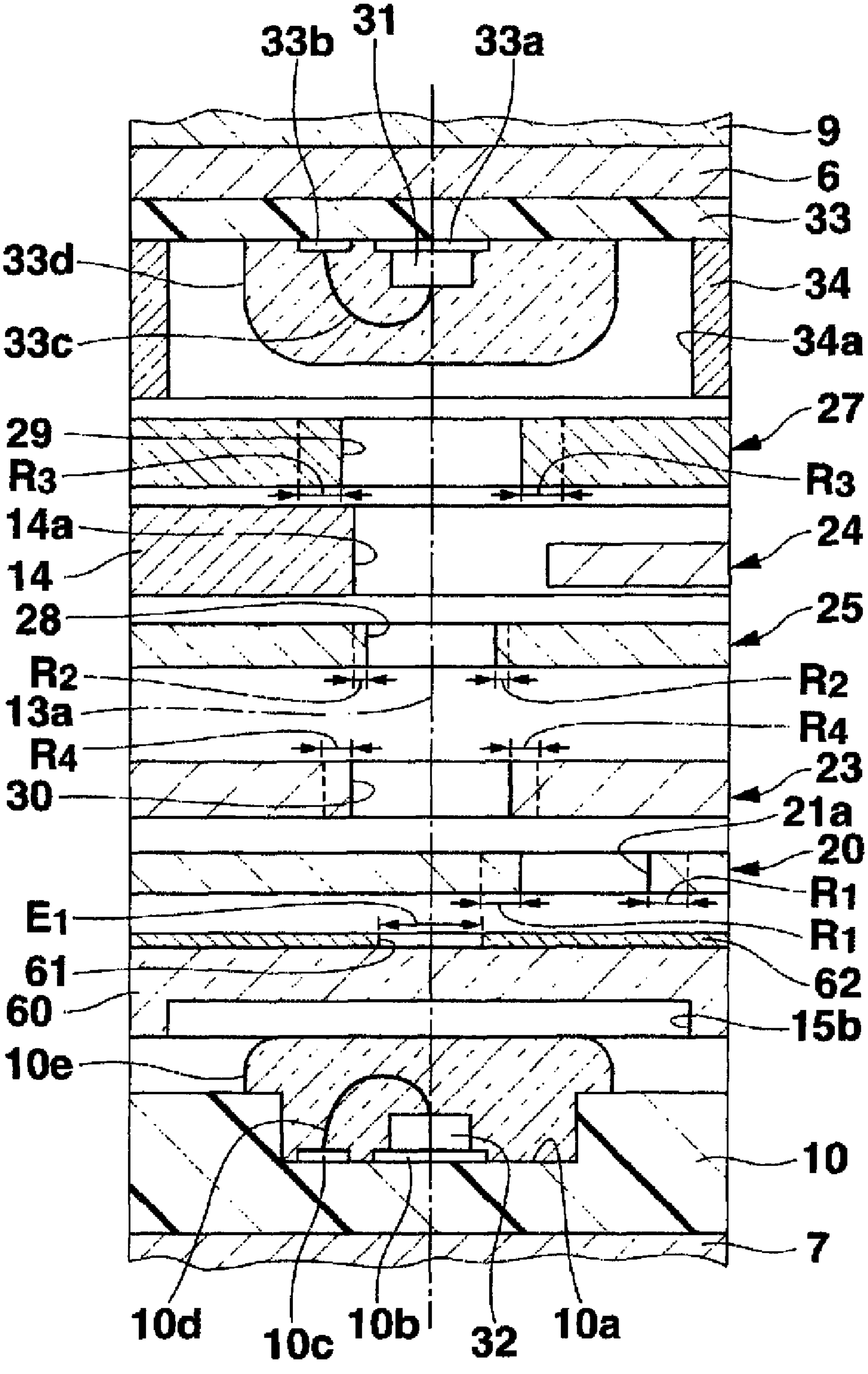
FIG. 23 is a vertical cross-sectional view similar to FIG. 12, showing the time-piece module of FIG. 22.

Next, referring to FIG. 22 to FIG. 23, a description is given of Embodiment 3 of the hand type wrist watch to which the invention is applied. The same parts as those in Embodiment 1 shown in FIG. 1 to FIG. 16 are denoted by like reference numerals, and a description thereof is omitted.

In this wrist watch, a train wheel bridge 60 is formed of a transparent synthetic resin, and a light leak restriction member 61 is provided on the upper surface of the train wheel bridge 60. In the other respects, the structure of Embodiment 3 is the same as that of the Embodiment 1.

Specifically, the light leak restriction member 61 is configured such that a light-blocking layer 62 is provided on the upper surface of the transparent train wheel bridge 60, except a predetermined region, that is, except the light transmission region E1. The light-blocking layer 62 is a film which blocks light, such as a print layer, an evaporation-deposition layer, a metal plating layer or an opaque resin sheet. Like Embodiment 1, the light leak restriction member 61 is provided with the light transmission region E1 at a position corresponding to the detection position P of the detector 13. The light transmission region E1 of the light leak restriction member 61, through which light passes, is narrowed by a maximum displacement amount R1, in consideration of the maximum displacement amount R1 in rotational movement of the first circular hole 21*a* which is caused by the rotation of the second wheel 20 when the second wheel 20 rotates by the minimum angle (12°) and the first circular hole 21*a* rotates to a position where the first circular hole 21*a* is completely apart from the detection position P.

Like Embodiment 1, in this hand position detection apparatus, too, when the second wheel 20 rotates by the minimum angle and the first circular hole 21*a* that is the standard hole is rotated and moved to a position that is substantially completely apart from the detection position P, even if displacement occurs in the rotational movement of the first circular hole 21*a* of the second wheel 20 due to the precision in fabrication of the second wheel 20 or back-lash, the light leak restriction member 61 can prevent light leak due to such displacement. Therefore, erroneous detection due to leak light can be prevented at the time of light detection by the detector 13, and the rotational positions of the second wheel 20, minute wheel 25 and hour wheel 27 can exactly be detected.

To be more specific, the light transmission region E1 of the light leak restriction member 61, through which light passes, is formed to be narrower by the maximum displacement amount R1, in consideration of the maximum displacement amount R1 in rotational movement of the first circular hole 21*a* which is caused by the rotation of the second wheel 20. Thus, when the second wheel 20 rotates by the minimum angle, even if displacement occurs in the rotational movement of the first circular hole 21*a* and part of the light from the light emitting device 31 passes through the first circular hole 21*a*, the leak light which has passed can surely be blocked by the light-blocking layer 62 of the light leak restriction member 61 of the strain wheel bridge 15.

In the above-described Embodiment 3, the description has been given of the case in which the train wheel bridge 60 is formed of a transparent synthetic resin and the light leak restriction member 61, which is formed of the light-blocking layer 62, is provided on the upper surface of the train wheel bridge 60. Alternatively, for example, such a structure may be adopted that the minute wheel hold plate 34 and main plate 14 are formed of a transparent synthetic resin, and a light leak restriction member that is formed of a light-blocking layer is provided on one surface of each of the minute wheel hold plate 34 and main plate 14.

In the above-described Embodiments 1 to 3 and modifications thereof, the description has been given of the case in which the light leak restriction hole 55, 15*a*, 50 or the light leak restriction member 61 is provided in the main plate 14, train wheel bridge 15 and minute wheel hold plate 34, which are disposed between the light emitting device 31 and light receiving device 32 of the detector 13. Alternatively, such a structure may be adopted that the surface of the mold resin 33*d* of the light emitting device 31 or the surface of the mold resin 10*e* of the light receiving device 32 is provided with a light leak restriction member 61 which is provided with a light-blocking layer 62, except a predetermined region (light transmission region) thereof.

Figure 24:
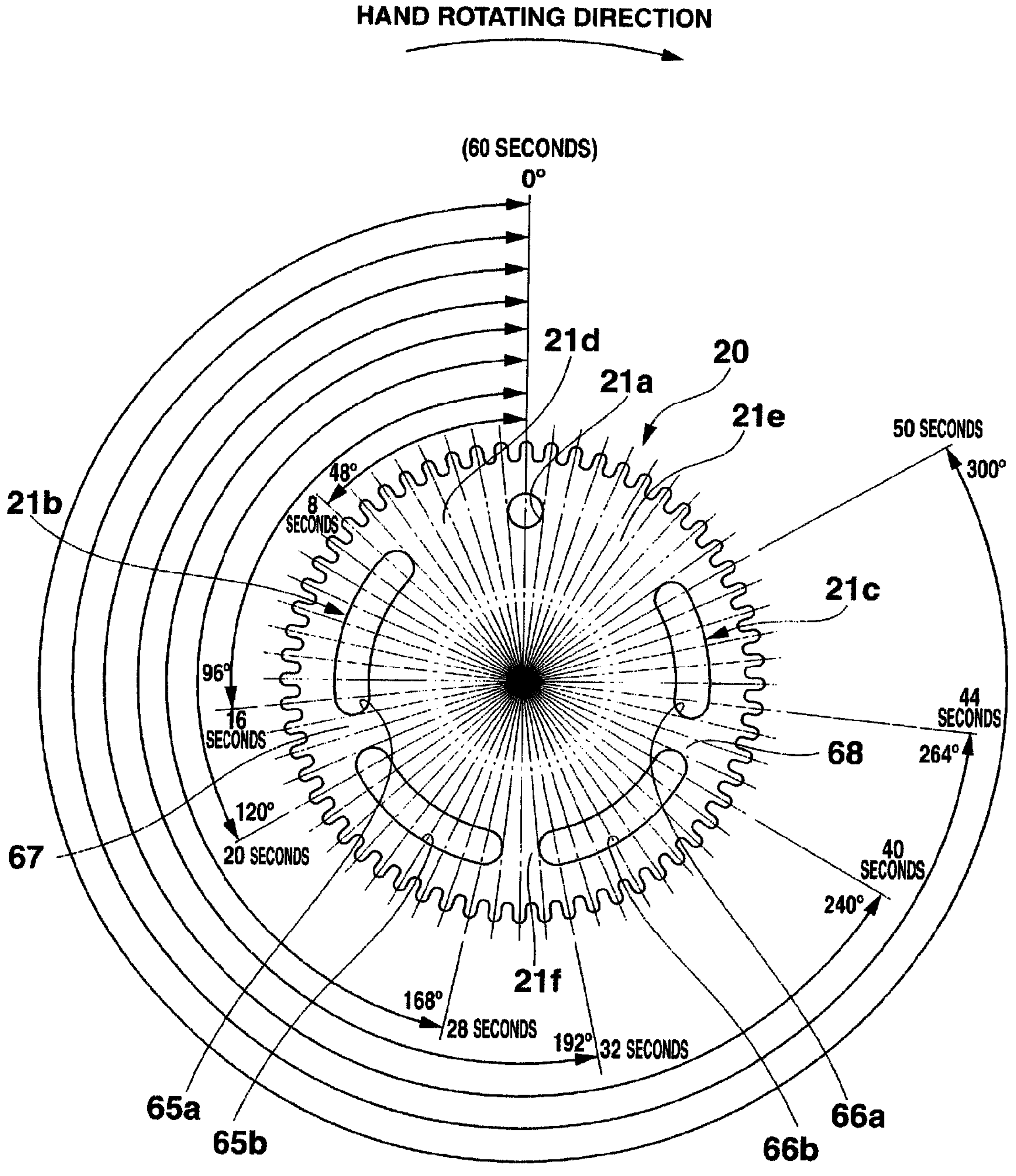
FIG. 24 is an enlarged view similar to FIG. 6, showing a modification of a plurality of arcuate light transmission holes, which are used along with the standard position light transmission hole in the second wheel that is used as a kind of rotational body, and light-blocking portions between the arcuate light transmission holes in a time-piece module of the hand type wrist watch of FIG. 1 which is combined with an optical-type rotational body position detection apparatus according to an embodiment of the invention.

Furthermore, in the above-described Embodiments 1 to 3 and modifications thereof, the description has been given of the case in which the first light transmission hole portion 21 of the second wheel 20 is provided with the second and third elongated holes 21*b* and 21*c* on both sides of the first circular hole 21*a* that is the standard hole. Alternatively, as in a modification shown in FIG. 24, for example, such a structure may be adopted that the second elongated hole 21*b* of the first light transmission hole portion 21 of the second wheel 20 is divided into two elongated holes 65*a* and 65*b*, and the third elongated hole 21*c* is divided into two elongated holes 66*a* and 66*b*.

In this case, a fifth light-blocking portion 67 is provided between the two elongated holes 65*a* and 65*b* of the second elongated hole 21*b*, and a sixth light-blocking portion 68 is provided between the two elongated holes 66*a* and 66*b* of the third elongated hole 21*c*. In the case where this second wheel 20 is applied to the hand position detection apparatus, substantially the same advantageous effect as in the Embodiments 1 to 3 and modifications thereof can be obtained.

In the above-described Embodiments 1 to 3 and modifications thereof, the invention is applied to the hand type wrist watch. However, the invention is not necessarily applied to the wrist watch, but is applicable to various hand type timepieces, such as a traveling clock, an alarm clock, a desk clock, and a wall clock.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical-type rotational body position detection apparatus comprising:

a light emitting unit which is configured to emit light;

a light detecting unit which is configured to detect light;

a fixing support member which supports the light emitting unit and the light detecting unit such that the light emitting unit and the light detecting unit are mutually opposed to and spaced apart from each other, and that light from the light emitting unit is detected by the light detecting unit;

a rotational body which rotates in a predetermined angle at each of predetermined time intervals to cross an optical axis connecting the light emitting unit and the light detecting unit, which includes a standard position light transmission hole disposed on a rotational locus crossing the optical axis, and which is configured such that after the rotational body takes one rotational movement over the predetermined angle within the predetermined time interval from a standard position at which a center of the standard position light transmission hole coincides with the optical axis, a peripheral edge of the standard position light transmission hole is positioned outside the peripheral edge of the standard position light transmission hole positioned at the standard position; and a light transmission restriction unit which is integrally provided on the fixing support member, which is disposed at a position crossing the optical axis, which permits passing of light, and which restricts a diameter of the passing light, wherein the light transmission restriction unit restricts the diameter of the light passing therethrough in such a manner that the diameter of the passing light is restricted to a diameter which is smaller than a minimum distance from the peripheral edge of the standard position light transmission hole to the optical axis within a range of a tolerable error of a positional displacement caused in the standard position light, transmission hole by the one rotational movement over the predetermined angle with the predetermined time interval of the rotational body.

2. The optical-type rotational body position detection apparatus according to claim 1, wherein the light transmission restriction unit includes a light-blocking member which has a light transmission hole for passing light, a center of the light transmission hole coincides with the optical axis, and the light transmission hole restricts the diameter of the passing light as described above.

3. The optical-type rotational body position detection apparatus according to claim 1, wherein the light transmission restriction unit includes a light-transmissive member which crosses the optical axis, and a light-blocking layer which covers the light-transmissive member, the light-blocking layer is provided with a light transmission hole for passing light, and the light transmission hole restricts the diameter of the passing light as described above.

4. The optical-type rotational body position detection apparatus according to claim 1, wherein the light transmission restriction unit is disposed adjacent to the light detecting unit in the rotational body side of the light detecting unit.

5. The optical-type rotational body position detection apparatus according to claim 4, wherein the light transmission restriction unit includes a light-blocking member which has a light transmission hole for passing light, a center of the light transmission hole coincides with the optical axis, and the light transmission hole restricts the diameter of the passing light as described above.

6. The optical-type rotational body position detection apparatus according to claim 4, wherein the light transmission restriction unit includes a light-transmissive member which crosses the optical axis, and a light-blocking layer which covers the light-transmissive member, the light-blocking layer is provided with a light transmission hole for passing light, and the light transmission hole restricts the diameter of the passing light as described above.

7. The optical-type rotational body position detection apparatus according to claim 4, further comprising at least one other light transmission restriction unit which is disposed in at least one of the light detecting unit side of the rotational body and the light emitting unit side of the rotational body.

8. The optical-type rotational body position detection apparatus according to claim 7, wherein the at least one other light transmission restriction unit is disposed between the rotational body and the light, emitting unit.

9. The optical-type rotational body position detection apparatus according to claim 8, wherein the at least one other light transmission restriction unit is disposed adjacent to the light emitting unit in the rotational body side of the light emitting unit.

10. The optical-type rotational body position detection apparatus according to claim 1, wherein the optical-type rotational body position detection apparatus is combined with a time-piece module which includes a housing, a rotational driving source supported by the housing and generating a rotational driving force, a second wheel, a minute wheel, and an hour wheel supported on the housing and rotated by the rotational driving force from the rotational driving source, and a second hand, a minute hand and an hour hand moved by the second wheel, the minute wheel and the hour wheel, the rotational body is at least one of the second wheel, the minute wheel and the hour wheel, and the fixing support member includes the housing.

11. The optical-type rotational body position detection apparatus according to claim 10, wherein the light transmission restriction unit includes a light-blocking member which has a light transmission hole for passing light, a center of the light transmission hole coincides with the optical axis, and the light transmission hole restricts the diameter of the passing light as described above.

12. The optical-type rotational body position detection apparatus according to claim 10, wherein the light transmission restriction unit includes a light-transmissive member which crosses the optical axis, and a light-blocking layer which covers the light-transmissive member, the light-blocking layer is provided with a light transmission hole for passing light, and the light transmission hole restricts the diameter of the passing light as described above.

13. The optical-type rotational body position detection apparatus according to claim 10, wherein the light transmission restriction unit is disposed adjacent to the light detecting unit in the rotational body side of the light detecting unit.

14. The optical-type rotational body position detection apparatus according to claim 13, wherein the light transmission restriction unit includes a light-blocking member which has a light transmission hole for passing light, a center of the light transmission hole coincides with the optical axis, and the light transmission hole restricts the diameter of the passing light as described above.

15. The optical-type rotational body position detection apparatus according to claim 13, wherein the light transmission restriction unit includes a light-transmissive member which crosses the optical axis, and a light-blocking layer which covers the light-transmissive member, the light-blocking layer is provided with a light transmission hole for passing light, and the light transmission hole restricts the diameter of the passing light as described above.

16. The optical-type rotational body position detection apparatus according to claim 13, wherein the rotational body includes the second wheel.

17. The optical-type rotational body position detection apparatus according to claim 13, further comprising at least one other light transmission restriction unit which is disposed in at least one of the light detecting unit side of the rotational body and the light emitting unit side of the rotational body.

18. The optical-type rotational body position detection apparatus according to claim 17, wherein the at least one other light transmission restriction unit is disposed between the rotational body and the light emitting unit.

19. The optical-type rotational body position detection apparatus according to claim 18, wherein the at least one other light transmission restriction unit is disposed adjacent to the eight emitting unit in the rotational body side of the light emitting unit.

* * * * *